(12) United States Patent
Sartori

(10) Patent No.: US 7,151,880 B2
(45) Date of Patent: Dec. 19, 2006

(54) DISPERSION-MANAGED OPTICAL SOLITON TRANSMISSION SYSTEM

(75) Inventor: Francesco Sartori, Agnadello (IT)

(73) Assignee: Prysmian Cavi E Sistemi Energia S.r.L., Milan (IT)

( * ) Notice: Subject to any disclaimer, the term of this patent is extended or adjusted under 35 U.S.C. 154(b) by 0 days.

(21) Appl. No.: 10/451,705

(22) PCT Filed: Dec. 27, 2001

(86) PCT No.: PCT/EP01/15338

§ 371 (c)(1),
(2), (4) Date: Nov. 13, 2003

(87) PCT Pub. No.: WO02/054632

PCT Pub. Date: Jul. 11, 2002

(65) Prior Publication Data

US 2004/0067032 A1    Apr. 8, 2004

Related U.S. Application Data

(60) Provisional application No. 60/259,858, filed on Jan. 8, 2001.

(30) Foreign Application Priority Data

Dec. 28, 2000   (EP) .................... 00128604

(51) Int. Cl.
G02B 6/02 (2006.01)
G02B 6/028 (2006.01)
G02B 6/036 (2006.01)
H04J 14/02 (2006.01)

(52) U.S. Cl. ............... 385/123; 385/124; 385/126; 385/127; 385/128; 398/79; 398/80; 398/81

(58) Field of Classification Search ............ 398/68, 398/79–82; 385/122–128
See application file for complete search history.

(56) References Cited

U.S. PATENT DOCUMENTS

| | | | |
|---|---|---|---|
| 5,764,841 A | 6/1998 | Iwatsuki et al. | 385/123 |
| 6,618,532 B1 * | 9/2003 | Sasaoka et al. | 385/123 |
| 6,731,877 B1 * | 5/2004 | Cao | 398/91 |
| 6,738,542 B1 * | 5/2004 | Doran et al. | 385/24 |
| 7,010,231 B1 * | 3/2006 | Franco et al. | 398/148 |

FOREIGN PATENT DOCUMENTS

GB    2 299 473 A    10/1996

(Continued)

OTHER PUBLICATIONS

Doran, N. J., "Dispersion Managed Soliton Systems", ECOC'98, Madrid, Spain, pp. 97-99, (Sep. 1998).

(Continued)

*Primary Examiner*—Brian Healy
*Assistant Examiner*—Derek L. Dupuis
(74) *Attorney, Agent, or Firm*—Finnegan, Henderson, Farabow, Garrett & Dunner, L.L.P.

(57) ABSTRACT

A dispersion-managed optical soliton transmission system uses alternating spans of positive-dispersion optical fiber having a negative slope and negative-dispersion optical fiber having a positive slope. For wavelength division multiplexing, the system has a map strength preferably between 4 and 8. An absolute value of average group velocity dispersion between 0.5 and 0.0 $ps^2/km$, and soliton power may vary between channels within 1 dB. Map periods, amplifier spacings, and dispersion values across a wavelength range of 1530–1600 nm are disclosed for bit rates of 10 and 40 Gbits/sec to maintain the ranges of average group velocity dispersion and soliton power.

20 Claims, 26 Drawing Sheets

FOREIGN PATENT DOCUMENTS

WO    WO 99/42869    8/1999

OTHER PUBLICATIONS

Devaney, J. F. L. et al., "Reduction of Collision Induced Timing Jitter in Multichannel Soliton Systems By Dispersion Management", ECOC'98, Madrid, Spain, pp. 89-90, (Sep. 1998).

Morita, I. et al., "Long-Haul Soliton WDM Transmission with Periodic Dispersion Compensation and Dispersion Slope Compensation", Journal of Lightwave Technology, vol. 17, No. 1, pp. 80-85, (Jan. 1999).

Doran, N. J. et al., "Remarkable Features of DM Solitons: Implications for High Speed and WDM Systems", Kyoto, Japan, Paper 3-A-2, pp. 1-11, (Nov. 1997).

Edagawa, N. et al., "Long Distance Soliton WDM Transmission Using a Dispersion-Flattened Fiber", OFC 1997, 16-21 (Feb. 1997), pp. 443-446.

Tanaka, K. et al., "400Gbit/s (20×20Gbit/s) Dense WDM Transmission Using Soliton-Based RZ Signals", ECOC '98, Madrid, Spain, pp. 85-86, (Sep. 98).

Smith, N. J. et al., "Soliton Transmission Using Periodic Dispersion Compensation", Journal of Lightwave Technology, vol. 15, No. 10, pp. 1808-1822, (Oct. 1997).

* cited by examiner

DISPERSION-MANAGED OPTICAL SOLITON TRANSMISSION SYSTEM

CROSS REFERENCE TO RELATED APPLICATIONS

This application is a national phase application based on PCT/EP01/15338, filed Dec. 27, 2001, the content of which is incorporated herein by reference, and claims the priority of European Patent Application No. 00128604.6, filed Dec. 28, 2000, and claims the benefit of U.S. Provisional Application No. 60/259,858, filed Jan. 8, 2001.

BACKGROUND OF THE INVENTION

FIELD OF THE INVENTION

The present invention relates generally to optical communication systems using RZ (return-to-zero) transmission, particularly soliton transmission. More particularly, the present invention relates to dispersion-managed soliton transmission systems for wavelength division multiplexing.

For optical communication systems, solitons provide a promising technique for transmitting information across long distances. An optical soliton is a type of optical pulse that can propagate through an optical fiber and maintain its waveform shape. Group velocity dispersion (GVD), that is related to the chromatic dispersion, plays an important role in the creation and propagation of solitons. Chromatic dispersion will be referred in the following simply as "dispersion". Dispersion varies the speed of spectral components of an optical pulse as a function of optical frequency, and causes a stretching or deformation of the temporal profile of the pulse. A balance between dispersion of the optical fiber and self-phase modulation helps to preserve the waveform shape of an optical soliton.

Group velocity dispersion is defined as $$\beta_2 = -(\lambda^2/2\pi c)D$$

where $\lambda$ is the wavelength of the pulse, c is the velocity of light in vacuum and D is the chromatic dispersion.

DESCRIPTION OF THE RELATED ART

Solitons, however, suffer from jitter that may originate from a number of sources. The most known is Gordon-Haus jitter that arises from spontaneous emission noise introduced by optical amplifiers. For optical systems that employ wavelength division multiplexing (WDM), the use of solitons is constrained by collision-induced jitter. Moreover, solitons will exist only for wavelengths with sufficient anomalous dispersion in the transmission path. A soliton's power is directly proportional to the fiber's dispersion, such that very low dispersion will cause the soliton power to vanish. In contrast, dispersion that is too large requires signal power that can become impracticably large.

To improve the performance of soliton transmission, dispersion-management is a known technique. In this technique, commonly called dispersion-managed (DM) soliton propagation, an optical communication system uses optical fibers with suitable amplification and appropriate variation of dispersion across the transmission distance. Dispersion-managed soliton propagation can be obtained with three transmission designs: (1) fiber spans having continuously and exponentially decreasing positive dispersion; (2) fiber spans having a step-wise approximation to a continuously and exponentially decreasing positive dispersion; and (3) fiber spans having alternating segments of positive and negative constant dispersion. This last option presents the most attractive one.

Propagating solitons using alternating spans of positive and negative dispersion fiber has several advantages. For one, it can permit enhanced soliton power in comparison to a regime in which the soliton propagates in an optical fiber having longitudinally constant dispersion (commonly referred as "average-soliton regime"), and hence higher signal-to-noise ratio. Jitter can be strongly reduced or even completely eliminated if the average dispersion is kept at very low (positive or negative) values around zero. On the other hand, the arrangement of fibers can also potentially provide strong reduction of four-wave mixing crosstalk if the absolute values of local dispersion are kept high enough.

Important parameters for a dispersion managed soliton system are the map strength S and the map depth $\delta$. For a soliton system having a map formed by alternating a positive dispersion fiber having length $L_1$ and dispersion $D_1$ and a negative dispersion fiber having length $L_2$ and dispersion $D_2$, these parameters are respectively defined as $$S = \frac{B^2 q_0^2}{[\ln(1+\sqrt{2})]^2}(|\beta_{21} - \beta_{2ave}|L_1 + |\beta_{22} - \beta_{2ave}|L_2) = \quad (1)$$

$$= \frac{B^2 q_0^2}{[\ln(1+\sqrt{2})]^2} 2|\beta_{2j} - \beta_{2ave}|L_j \qquad j=1,2$$

$$\delta = \quad (2)$$

$$2\frac{|\beta_{21}-\beta_{2ave}|L_1 + |\beta_{22}-\beta_{2ave}|L_2}{|\beta_{2ave}|L_P} = \frac{4|\beta_{2j}-\beta_{2ave}|L_j}{|\beta_{2ave}|L_P} \quad j=1,2$$

where:
B is the bit rate
$q_0$ is the bit time period normalized to the pulsewidth,
$L_P = L_1 + L_2$ is the period of the dispersion map,
$\beta_{21} = -(\lambda^2/2\pi c)D_1$ is the GVD corresponding to dispersion $D_1$,
$\beta_{22} = -(\lambda^2/2\pi c)D_2$ is the GVD corresponding to dispersion $D_2$
$\beta_{2ave} = (\beta_{21}L_1 + \beta_{22}L_2)/L_P$ is the average GVD of the system.

In practice, the map strength is proportional to the dispersion difference between the two fibers and the map depth is proportional to the ratio between said dispersion difference and the average dispersion of the system.

Patents and publications describe designs of optical communication systems using dispersion-managed solitons.

Smith et al., "Soliton Transmission Using Periodic Dispersion Compensation," *J. Lightwave Tech.*, vol. 15, no. 10, pp. 1808–1822 (October 1997) examines the behavior of solitons in optical fibers where the dispersion is alternated between the normal and anomalous regimes. The periodic nature of the system strongly modifies the shape of the stable soliton pulses, and increases their energy when compared with solitons in equivalent uniform fibers. This leads to both an increased signal-to-noise ratio at the receiver and reduced Gordon-Haus timing jitter, compared with a uniform fiber system with equal path-average dispersion. As stated in the same article, the work of Smith et al. has concentrated on propagation in a single time division multiplexed channel.

U.S. Pat. No. 5,764,841 describes an optical fiber transmission line having first optical fibers with dispersion values greater than the average dispersion value over the entire transmission distance and second optical fibers with dispersion values less than the average dispersion value, wherein the average dispersion value is in the anomalous dispersion region. The respective lengths $L_i$ and $L_i'$ of the first and second optical fibers are shorter than the soliton length $Z_0$, and the relationship between the lengths $L_i$ and $L_i'$ and the larger of the respective differences $D_i$ and $D_i'$ between the dispersion values of the first and second optical fibers and the average dispersion value $D_{av}$ satisfies the following condition:

$(L_i+L_i')/Z_0 < 0.35/\{1+0.20(\text{the larger of } D_i \text{ and } D_i'/D_{av})\}$ In one embodiment, each pair of optical fibers is formed from an optical fiber having a length L, a dispersion slope S and a dispersion value $D_{av}+D_i$, and an optical fiber having a length L, a dispersion value $D_{av}-D_i$ symmetric with respect to the average dispersion $D_{av}$, and a dispersion slope S' (=−S or at least a value having the opposite sign from that of S). In another embodiment, each pair of optical fibers is formed from an optical fiber having a length $L_i$, a dispersion slope S and a dispersion value amplitude $D_i$ with respect to the dispersion value $D_{av}$, and an optical fiber having a length $L_i'$, a dispersion slope S' (=−S or at least a value having the opposite sign from that of S), and a dispersion value amplitude $D_i'$ such that the local average dispersion with the other fiber is equal to the average dispersion $D_{av}$ over the entire transmission distance. Furthermore, the sum of of $S_iL_i$ and $S_i'L_i'$ is made equal to zero. In both embodiments, the signs of the dispersion slopes S and S' are different, so that they mutually reduce the effects of higher-order dispersion (variations of the dispersion value with respect to the wavelength). Furthermore, when the absolute values of the dispersion slopes are equal, waveform distorsion after transmission due to higher-order dispersion can be suppressed because of cancellation of higher-order dispersion.

Applicants observe that '841 patent does not mention wavelength division multiplexing (WDM) transmission of solitons. Furthermore, Applicants observe that in the '841 patent no preference is disclosed in choosing the sign of the slope of the positive dispersion optical fiber and, correspondingly, the sign of the slope of the negative dispersion optical fiber in each pair of optical fibers.

Several publications address the impact of WDM on dispersion-managed soliton systems.

For instance, Doran et al., "Remarkable Features of DM Solitons: Implications for High Speed and WDM Systems," *Int'l Symposium on New Trends in Optical Soliton Transmission Systems*, Kyoto, Japan, Paper 3-A-2 (November 1997) shows the dependence of enhanced power for dispersion-managed (DM) solitons on dispersion map strength and depth for a wide range of parameters. As explained in the article, a consequence of the dependence of the power enhancement on the map strength and on the map depth is that dispersion management gives a natural compensation for higher-order dispersion (dispersion slope). In conventional soliton WDM systems the dispersion slope required increasing channels power with wavelength in proportion to the fibre dispersion. In DM soliton systems, however, the variation of power enhancement factor η with the average dispersion $\beta_{ave}$ of the system offers a mechanism to maintain equal powers in each channel, even in the presence of third order dispersion. As an example, Doran et al. consider the case where the dispersion slope is the same in each fibre. In this case, the map strength is equal for all wavelengths, but since $\beta_{ave}$ increases with wavelength, the map depth decreases with wavelength. Thus, in principle the decrease in the power enhancement factor η with the map depth provides a means to equalise channel powers.

Other publications by the same researchers analyze third-order dispersion compensation and additional aspects of soliton transmission.

For example, Doran, "Dispersion Managed Soliton Systems," ECOC'98, Madrid, Spain, pp. 97–99 (September 1998) discloses that dispersion management allows WDM to the average dispersion over a wide range of wavelengths, the extent of which will depend on the map strength. Since these solitons can exist in a region around zero dispersion large scale WDM in this way is possible. Higher order dispersion (generally named third-order dispersion) will be a significant limit since the jitter is directly proportional to the global average dispersion and of course it is not possible without compensation to maintain low average dispersion over a range of wavelengths. However, an important observation is that the soliton power is no longer proportional but remains largely independent of this for strong maps. Thus similar powers can be maintained for all the channels around zero dispersion.

In another article, Devaney et al, "Reduction of Collision Induced Timing Jitter in Multichannel Soliton Systems by Dispersion Management," ECOC'98, Madrid, Spain, pp. 89–90 (September 1998) disclose that third-order dispersion compensation was found to be effective in drastically reducing collision-induced timing jitter. As said in this article, with third order dispersion compensation, using negative-slope fibre in the second half of the dispersion profile, it is possible to reduce the average dispersion as well as making the average constant over the bandwidth chosen. Jitter is then reduced even further than by using dispersion management.

N. Edagawa et al., "Long Distance Soliton WDM Transmission Using a Dispersion-flattened Fiber", OFC 1997, 16–21 February 1997, Postdeadline paper PD19, pp. 443–446, describes an experimental soliton system in a 100 km fiber loop. The experimental set-up used spans of a dispersion flattened fiber (DFF) having a positive dispersion value of about 4.4–1.5 ps/nm/km. A dispersion-compensating fiber was added at the end of each span. The system average dispersion and dispersion slope at 1555 nm were 0.03 ps/nm/km and −0.0007 ps/nm²/km, respectively. Transmission performance in the experiments was severely degraded due to the large chromatic dispersion of the DFF used in the experiments. The paper concludes that transmission performance should be much improved by using a DFF with a small dispersion around 1 ps/nm/km.

K. Tanaka et al., "400 Gbit/s (20×20 Gbit/s) dense WDM Transmission Using Soliton-based RZ Signals", ECOC 1998, 20–24 September 1998, pp. 85–86, describes an experimental soliton system using a recirculating loop. The loop comprises three spans of 30 km of a dispersion flattened fiber (DFF) having an average dispersion slope of −0.0002 ps/nm²/km and an average chromatic dispersion of 1.0 ps/nm/km at 1555 nm. The accumulated chromatic dispersion of the loop was compensated for by a spool of dispersion-compensating fiber (DCF) with −100 ps/nm. The average dispersion of the loop was 0.06 ps/nm/km.

Applicants observe that the reduction of the dispersion of the DFF until values around 1 ps/nm/km, as taught in these last two articles, may cause four-wave mixing problems with increasing power-per-channel in a WDM soliton system.

WO 99/42869 discloses a low slope dispersion managed waveguide that has alternating segments of positive and negative dispersion. The negative dispersion fiber has a negative slope across a wavelength range, while the positive dispersion fiber has a positive slope.

GB 2,299,473 discloses a communication system comprising interleaved optical fibre length of two types, having equal and opposite non-zero dispersion throughout the operating wavelength bandwidth (which may be as wide as 50 nm). The gradient of dispersion-versus-wavelength characteristic of one type must be positive, of the other type negative. Preferably the absolute values of the gradients of wavelength dispersion values of the normal dispersion fiber and the anomalous dispersion fiber are within the range of 0.1 to 0.01 ps/nm$^2$·km. Applicants remark that the above patent application does not relate to a soliton system nor to soliton transmission. Moreover, the GB patent application indicates that the light signals can be transmitted in the disclosed telecommunication system without waveform degradation by preventing the waveform degradation due to self-phase modulation. As stated above, self-phase modulation is essential in determining propagation of soliton pulses.

SUMMARY OF THE INVENTION

Applicants have observed that the nonlinearity coefficient of optical fibers generally decreases with increasing wavelength. Applicants have perceived that this fact can play a role in determining how a dispersion managed soliton system can be designed. Applicants have recognized that the above mentioned behaviour of the nonlinearity coefficient with respect to the wavelength of the optical fibers of a dispersion managed soliton system may affect the soliton power-per-channel, in a WDM system. This fact was not recognized, to Applicants' knowledge, in the prior art. For example, it cannot be found in the above cited articles of Doran et al., that consider various parameters of the system at a single wavelength and then extend the obtained results to a range of wavelengths, with no regard to the variation of the fibers' nonlinearity coefficient in the whole range of wavelengths.

Applicants have found that the nonlinearity coefficient of the optical fibers may cause the power-per-channel to be inserted in a WDM dispersion managed soliton system to vary with the wavelength, even in presence of strong dispersion maps. Thus, the behaviour of the nonlinearity coefficient of the optical fibers has to be carefully considered in order to keep an equalized power-per-channel, when designing a WDM dispersion managed soliton system.

Applicants have found that in dispersion managed soliton systems a dispersion difference decreasing with wavelength helps in compensating the decreasing nonlinearity coefficient of the fibers. By alternating in an optical soliton transmission system spans of positive dispersion fiber with a negative slope and of negative dispersion fiber with a positive slope, the difference of the power between channels to be inserted in the system can be significantly reduced. In other words, the effect of the nonlinearity of the fibers used in the system is compensated by reducing the map strength at increasing wavelengths. This can lead to advantageous WDM communication. When the maximum system average dispersion is set and average dispersion and soliton power are limited to vary, for example, within 0–0.4 ps/nm/km and 1 dB respectively, optical fiber spans having selected dispersion values across 1530–1600 nm may be designed based on a given bit rate, such as, for example, 2.5, 10, or 40 Gbits/sec.

A dispersion-managed optical soliton transmission system consistent with the present invention communicates a plurality of wavelength-division-multiplexed optical solitons across a line of optical fiber. The communication takes place within a wavelength range of about 1530 nm to about 1600 nm, and the system includes at least a first span of optical fiber and at least a second span of optical fiber. The first span has a length $L_1$ and positive dispersion with a negative dispersion slope. The second span has a length $L_2$ and is positioned in series with the first span in the line. The second span has negative dispersion with a positive dispersion slope across the wavelength range.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Figure 1:
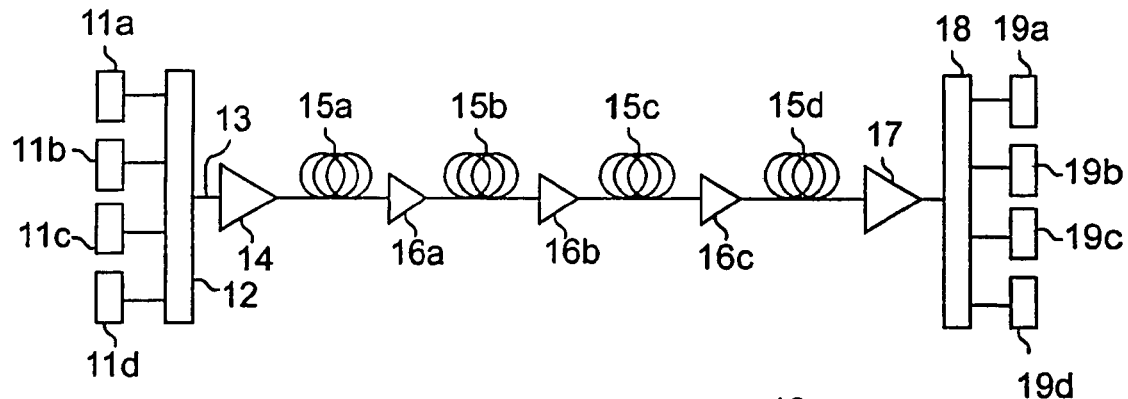
FIG. 1 is block diagram of a dispersion-managed optical soliton system for WDM transmission consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

The dispersion-managed optical soliton system of the present invention includes spans of optical fibers collectively enabling solitons in the WDM system to exhibit a relatively flat power level between any wavelengths within the WDM range. As well, the optical fiber spans have optical and physical characteristics that permit solitons traveling in a WDM condition to have preferably a low maximum global average dispersion across an operating wavelength range.

FIG. 1 illustrates a block diagram of a WDM system 10 for transmitting soliton signals. At least two transmitters 11a–11d supply RZ optical signals in a soliton condition, each at a respective wavelength. In the following, we will refer to an optical signal having a respective wavelength to as a "channel". In general, systems using any number of channels can be designed. The design of transmitters 11a–11d and their affiliated equipment is known to those having ordinary skill in the art. A multiplexer 12 combines the individual soliton wavelengths received from transmitters 11a–11d onto optical path 13 as a WDM signal. A transmitter power amplifier 14 boosts the power of all wavelengths in the WDM signal and launches it for transmission across a long distance line of optical fiber.

The long distance optical transmission line in WDM soliton system 10 includes a series of optical fibers 15a–15d, typically separated by amplifiers 16a–16c, preferably optical amplifiers. Optical fibers 15a–15d are typically cabled and are included in so called "spans". As explained below, optical fibers of the spans have differing optical and physical characteristics to provide desired maintenance of the solitons within the WDM signal. Amplifiers 16a–16c are preferably erbium-doped fiber amplifiers, which can have an amplification range from about 1530 to about 1600 nm. Conventional erbium-doped fiber amplifiers operate within the range of about 1530–1565 nm, but an extended amplification range can be achieved by two or more amplifiers coupled in parallel, each covering a respective sub-band of the overall amplification range. In an examplary embodiment a first amplifier covers the band 1529–1535, a second amplifier covers the band 1541–1561 nm and a third amplifier covers the band 1575–1602 nm. Even broader amplification ranges may be available in the future. Further, other kinds of optical amplifiers can be used, within suitable wavelength ranges. Although amplifiers 16a–16c are shown between each optical fiber span 15a–15d, the WDM signal may pass through multiple optical fiber spans before reaching an optical line amplifier, or, viceversa, the WDM signal may pass through multiple amplifiers in a single span.

A receiving portion of the optical soliton system 10 generally comprises a receiver power amplifier 17, a demultiplexer 18, and a series of receiving units 19a–19d. The receiver power amplifier boosts the attenuated optical soliton WDM signal for recognition by the receiving equipment. Demultiplexer 18 separates the WDM signal into its respective soliton wavelengths and passes those wavelengths to individual receivers 19a–19d, which detect and process the information carried by the discrete soliton channels.

Figure 2:
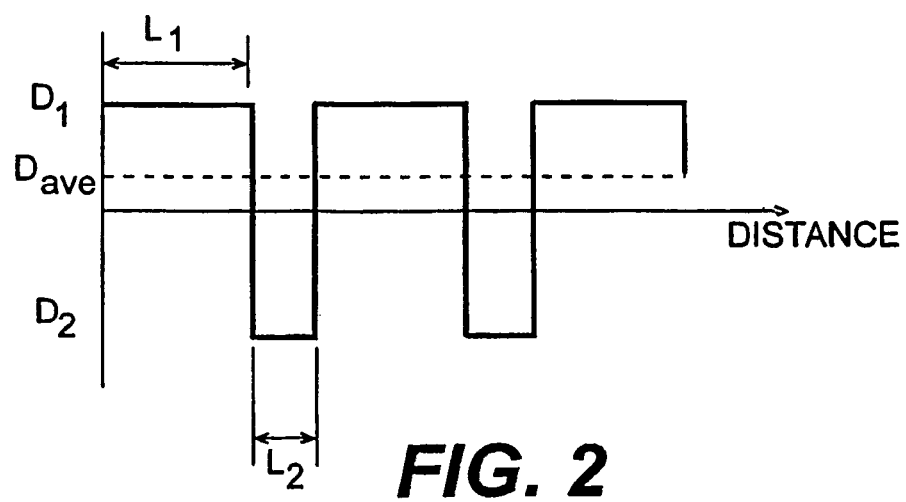
FIG. 2 is an exemplary dispersion map of dispersion versus distance for the dispersion-managed optical soliton system of FIG. 1.

FIG. 2 shows the dispersion map for optical fiber spans 15a–15d and one additional span as an example. In the known manner for dispersion-managed soliton systems, the dispersion level alternates between negative and positive values for the respective lengths of optical fiber. For example, span 15a in FIG. 1 has a length $L_1$ and a dispersion $D_1$, which is a positive value. Span 15b has a length $L_2$, with a negative and constant dispersion value $D_2$. The succeeding spans of optical fiber downstream from 15a and 15b repeatedly alternate in their lengths and dispersion values substantially with a dispersion map period $L_P = L_1 + L_2$. In particular, the first span of the system may have a length lower than $L_1$, in dependence of a level of pre-chirping that can be superimposed at the transmitter to the pulses. If no pre-chirp is introduced, the first span may be designed so that it has a length substantially equal to $L_1/2$. As shown in FIG. 2, the average dispersion $D_{ave}$ across the entire chain of optical fibers in this example has a value greater than zero. Depending on the chosen design, the average dispersion $D_{ave}$ may be equal to zero or greater than zero to accommodate desired performance for the soliton signals. Less preferably, the average dispersion $D_{ave}$ may be lower than zero. It has to be noticed that, from the definition of GVD given above, a positive average dispersion $D_{ave}$ of the system corresponds to a negative average GVD.

In accordance with the present invention, a dispersion-managed optical soliton transmission system for communicating a plurality of wavelength-division-multiplexed optical solitons across a line of optical fiber within a predetermined wavelength range, e.g. of about 1530 nm to about 1600 nm, includes at least a first span of a first dispersive element comprising a positive dispersion with a negative dispersion slope across the wavelength range. The system includes at least a second span comprising a second dispersive element, being positioned in series with the first span in the line, having a negative dispersion with a positive dispersion slope across the wavelength range. To the ends of the present invention, in order to evaluate the sign and the value of the slope of the dispersive elements the ratio $$(D_{\lambda max} - D_{\lambda min})/(\lambda_{max} - \lambda_{min})$$

is used, where:

$\lambda_{max}$ and $\lambda_{min}$ are the ends of the wavelength range considered (e.g. the range of a WDM collection of channels);

$D_{\lambda max}$ and $D_{\lambda min}$ are, respectively, the dispersion values of the dispersive elements at $\lambda_{max}$ and $\lambda_{min}$.

Such an optical soliton communication system with dispersion management can exhibit a flat soliton power behavior with wavelength and a low average dispersion. These conditions enable transmission of optical solitons in a WDM system for acceptable receiver detection without introducing timing jitter of the solitons from excessive average dispersion levels along the line.

The dispersive elements in the first and second span may be both optical fibers. The length of the first span may be substantially equal to the length of the second span (symmetrical map), or unequal (asymmetrical map).

Alternatively, one of the dispersive elements may be an optical grating and the other dispersive element can be an optical fiber. A map comprising an optical fiber and an optical grating in series with each other can be seen as a "completely symmetrical" map, that is, a dispersion map in which substantially all the map period $L_P$ is covered by the optical fiber and the grating is a dispersive element having a very short length (substantially zero) with respect of the optical fiber. Preferably, the optical grating can be a fiber grating.

In the following, for the sake of clarity, the dispersive elements considered will be both optical fibers. It has to be understood that the same considerations apply also for the above mentioned completely asymmetrical map.

Dispersion map parameters that may be used for determining the soliton power are the map strength S and the map depth $\delta$. Their expressions have been previously reported (see (1) and (2) above).

The average power of a DM soliton at the output of the optical amplifiers is given by the product of an enhancement factor $\eta(S,\delta)$ and the power $P_{ave}$ of a soliton propagating in the average-soliton regime in a fiber with a GVD equal to $\beta_{2ave}$:

$$P_{DM} = \eta(S,\delta) P_{ave} \quad (3)$$

where $P_{ave}$ is proportional to $\beta_{2ave}$ and, for $\beta_{2ave} \leq 0$, takes the following form:

$$P_{ave} = F_{pem} \frac{2|\beta_{2ave}| q_0 B^2}{\gamma_{ave}} \quad (4)$$

and $$F_{pem} = \frac{\alpha_{ave} L_A}{1 - \exp(-\alpha_{ave} L_A)} \quad (5)$$

In these equations, $F_{pem}$ is a pre-emphasis factor, $\alpha_{ave}$ is the average of the loss coefficients of the two fibers, $\gamma_{ave}$ is the average of the nonlinearity coefficients of the two fibers, and $L_A$ is the amplifier spacing. In the following, $\alpha_{ave}$ and $\gamma_{ave}$ will be referred as "average fiber loss coefficient" and "average nonlinearity coefficient", respectively.

Semi-empirical formulas for the enhancement factor $\eta(S,\delta)$ are given in the cited papers by Doran. For strong maps, that is for map strength values S greater than about 4, solitons exist also at zero or normal (negative) average dispersion. A fitting formula for the enhancement factor $\eta(S,\delta)$ for $S>4$ is the following:

$$\eta = \frac{0.2\delta}{S}\left[S = 3.7 + \sqrt{(S-3.7)^2 + \frac{180S}{\delta}}\right] \quad (6)$$

The range $S \geq 4$ is of special interest for WDM soliton systems. In order to reduce the probability of collision between temporally adjacent soliton pulses, the map strength may be preferably lower than about 12 in the whole range of wavelengths considered. More preferably, the map strength may be lower than about 8 in the whole range of wavelengths considered.

The use of the pre-emphasis factor $F_{pem}$ in equation (4) applies when the dispersion map period is not equal to the amplifier spacing or when the dispersion map period is not a multiple of the amplifier spacing. When the map period is equal to or is a multiple of the amplifier spacing, then the power scaling is somewhat different: in this situation, power enhancement depends on the position of the amplifier relative to the dispersion map. Nevertheless, equation (4) may be used, even in case of equal amplification and dispersion map intervals, to evaluate relative power variation between channels (i.e., with respect to wavelength), being aware that the absolute power levels obtained in case of equal intervals are only representative.

The three standard bit rates of 2.5, 10, and 40 Gbits/sec may roughly define three different map period length regimes for fibers having the same level of dispersion. In fact from the definition of map strength S in equation (1), if the bit rate increases fourfold, the map period length must be reduced by 16 times in order to maintain the same value of S (provided that the $q_0$ factor is not varied). For example, two fibers having dispersions of +10 and −10 ps/nm/km at 1550 nm and equal lengths may require each span to be between 800–1600 km for 2.5 Gbits/sec, 50–100 km for 10 Gbits/sec, and 3–6 km for 40 Gbits/sec. It has to be intended that the above mentioned bit rate values and length values are only exemplary and that the scope of the invention is not limited to these values.

The optical soliton communication system has an optical fiber line of alternating segments that may provide an average GVD value $\beta_{2ave}$ of between 0.0 and −0.5 ps²/km and a flat soliton power-per-channel level. The behaviour with wavelength of the GVD $\beta_{21}$ and $\beta_{22}$ (or the corresponding behaviour of the dispersion, $D_1$ and $D_2$) of the two fibers need to be determined in order to obtain a predetermined soliton power variation together with a predetermined average dispersion variation over the wavelength range of interest. If the behaviors of $F_{pem}$, $\alpha_{ave}$, and $\gamma_{ave}$ with wavelength are known, and if it is assumed that $\beta_{2ave}$ has a defined maximum absolute value across the wavelength range and $\beta_{2ave}$ and $P_{DM}$ have predetermined variations with wavelength, then the GVD behaviour (or the dispersion behaviour) with wavelength of the two fibers can be determined.

Equalisation of power-per-channel is advantageous for a WDM transmission, as unbalancing of the soliton power-per-channel may affect transmission quality. For example, the gain curve of the amplifiers is a typical source of such an unbalancing and has to be considered in order to have an acceptable signal-to-noise ratio and/or bit-error-rate at the receiver for all channels. If the optical fibers do not introduce substantial unbalancing of the soliton power-per-channel to be inserted in the line, the control of the good transmission quality can be made substantially independently of the optical fibers used. That is, a lower number of parameters has to be considered in the design of the optical system.

Low global average group velocity dispersion is advantageous as it can allow a low level of jitter for all the transmitted channels. In particular, a more preferred range of global average dispersion for reducing the level of jitter to a very low value with a total length of the soliton system of 10.000 km and more, is comprised between about −0.05 and 0.0 ps²/km. In this respect, Applicants have further observed that for high bit rates (e.g. higher than 10 Gbit/s) there is an optimum low value of global average dispersion comprised in this range, that allows to achieve a minimum level of jitter.

Guidance to determine the dispersion characteristics of the two fibers in order to achieve minimum average dispersion and flat soliton power-per-channel may be given by the following equation:

$$|D_j - D_{ave}|L_j = \quad (7)$$

$$\left\{3.7 + \frac{P_{DM}q_0 L_P}{1.6 \cdot [\log(1+\sqrt{2})]^2}\frac{\gamma_{ave}}{F_{pem}} - \frac{18B^2 q_0 \lambda^2}{\pi c P_{DM}}\frac{F_{pem}}{\gamma_{ave}}D_{ave}\right\}$$

$$\frac{\pi c[\log(1+\sqrt{2})]^2}{B^2 q_0^2 \lambda^2}$$

Once the desired dispersion-managed soliton power and average dispersion behaviours with wavelength for the line are selected, and once system parameters such as the bit rate, the pulsewidth, the map period length, and the amplifier spacing are fixed, dispersion specifications for the two fibers comprising the dispersion map can be determined. Vice-versa, once the dispersion characteristics of the fibers and of the system are set, together with the other system parameters, such as the bit rate, the pulsewidth, the map period length and the amplifier spacing, a range of useful soliton power can be defined.

In accordance with the preferred embodiments of the present invention, Applicants have modeled optical fiber spans comprising a dispersion-managed soliton system for WDM transmission using computer tools within the knowledge of one skilled in the art. The representative soliton system parameters chosen were the following:

$$-q_0 \text{ factor}: q_0 = \frac{1}{BT_{FWHM}}\ln(1+\sqrt{2}) \approx 0.88 \cdot \frac{1}{BT_{FWHM}} = 5;$$

average fiber loss coefficient:

$$\alpha_{ave}(\text{dB/km}) = 1.085 \times \lambda^{-4}(\mu m) + 7 \times 10^{11} \times \exp(-49/\lambda\ (\mu m));$$

soliton average power ($P_{DM}$) variation with wavelength within 1 dB for wavelength in the range 1529–1602 nm;

average system dispersion between 0 and 0.40 ps/nm/km (corresponding to an average GVD $\beta_{2ave}$: $-0.5 \leq \beta_{2ave} \leq 0$ ps²/km); and map strength $S \geq 4$.

Figure 3:
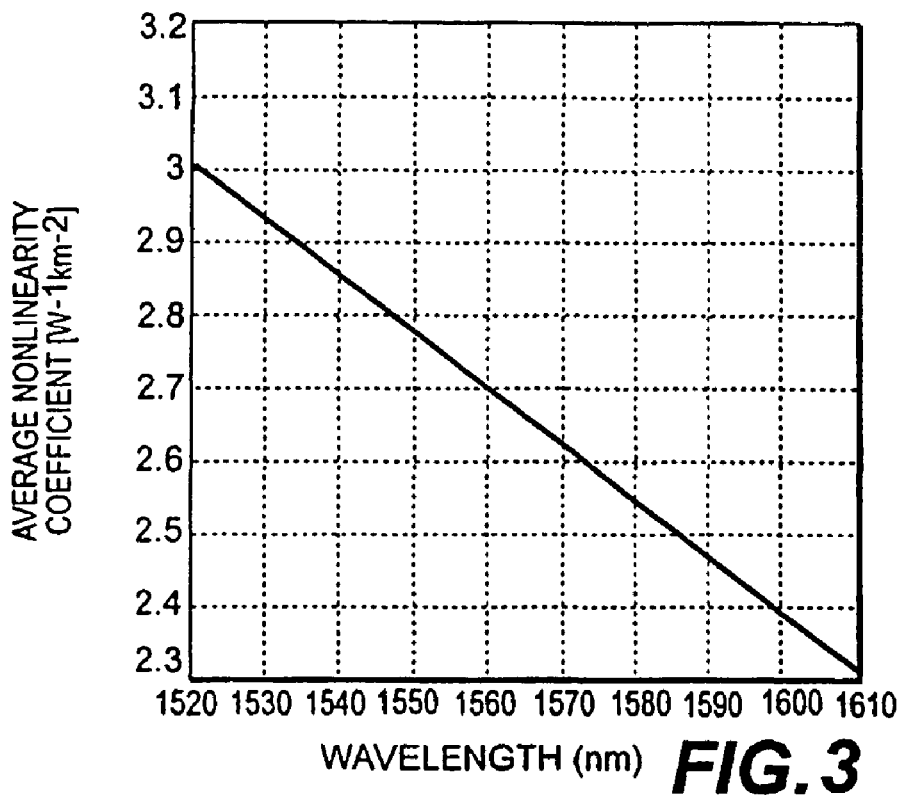
FIG. 3 is a graph of the average nonlinearity coefficient versus wavelength for an exemplary optical fiber line within the soliton system of FIG. 1.
Figure 4:
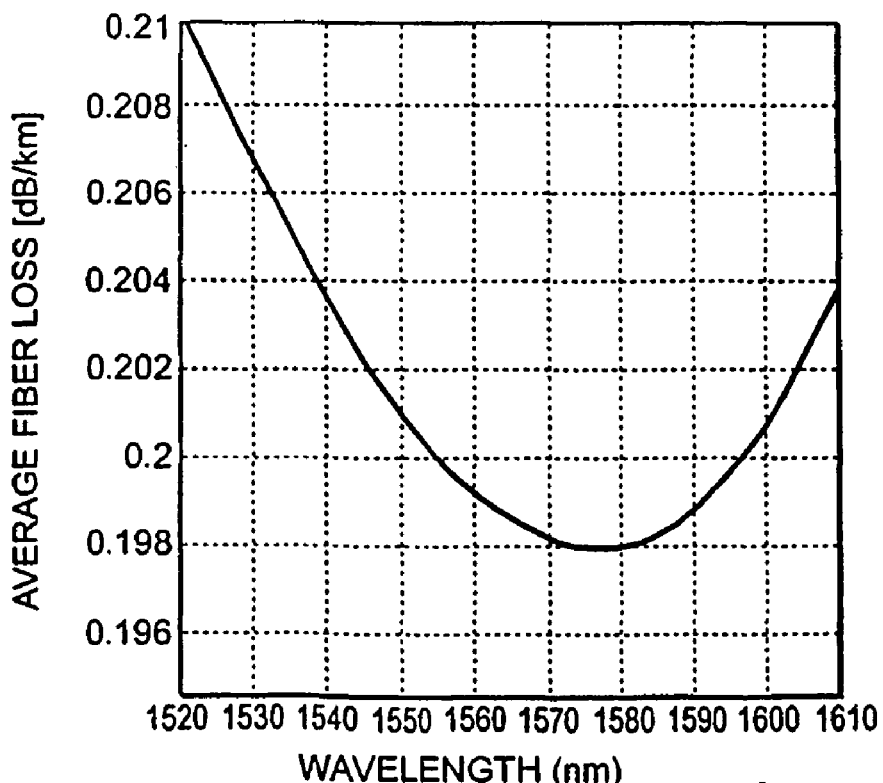
FIG. 4 is a graph of the average fiber loss versus wavelength for an exemplary optical fiber line within the soliton system of FIG. 1.

FIGS. 3 and 4 show characteristics for the optical fibers of the representative soliton system. In particular, the average nonlinearity coefficient $\gamma_{ave}$ is plotted in FIG. 3 as a function of wavelength and has a negative slope. The wavelength dependence and values of $\gamma_{ave}$ were simulated for typical refractive-index profiles. The curve for average fiber loss coefficient $\alpha_{ave}$ is depicted in FIG. 4. The wavelength dependence of the fiber loss was modelled taking into account Rayleigh scattering and IR absorption.

Various embodiments of the present invention described below address optical soliton systems for achieving these desired results with different map periods, span lengths, amplifier spacings and bit rates. In particular, FIGS. 5A–13B illustrate the dispersion characteristics across a wavelength band of about 1530–1600 nm for exemplary optical fiber combinations for a dispersion managed soliton system having bit rate, span lengths $L_1$ and $L_2$, amplifier spacing $L_A$, and map period $L_P$ specified in the following table 1.

TABLE 1

| EMB. | Bit Rate | $L_1$(km) | $L_2$(km) | $L_A$(km) | $L_P$(km) |
|---|---|---|---|---|---|
| 1 | 10 Gbit/s | 50 | 50 | 100 | 100 |
| 2 | " | 60 | 60 | 120 | 120 |
| 3 | " | 100 | 100 | 100 | 200 |
| 4 | " | 120 | 120 | 120 | 240 |
| 5 | " | 44 | 6 | 50 | 50 |
| 6 | " | 92 | 8 | 100 | 100 |
| 7 | " | 112 | 8 | 120 | 120 |
| 8 | " | 40 | 60 | 100 | 100 |
| 9 | " | 48 | 72 | 120 | 120 |
| 10 | 40 Gbit/s | 15 | 15 | 90 | 30 |
| 11 | " | 20 | 20 | 80 | 40 |
| 12 | " | 25 | 25 | 100 | 50 |
| 13 | " | 30 | 30 | 90 | 60 |

The four curves shown in each plot, in order of increasing absolute value of dispersion, are obtained from (7) by choosing the following combination of dispersion-managed soliton power and average GVD values.

a) $P_{DM} = P_{DM}(S=4)$; $\beta_{2ave} = -0.5$ ps²/km
b) $P_{DM} = P_{DM}(S=4) \times 1.26$; $\beta_{2ave} = -0.5$ ps²/km
c) $P_{DM} = P_{DM}(S=4)$; $\beta_{2ave} = 0$ ps²/km
d) $P_{DM} = P_{DM}(S=4) \times 1.26$; $\beta_{2ave} = 0$ ps²/km $P_{DM}(S=4)$ is the minimum soliton power value required to obtain S greater than or equal to 4 in the whole wavelength range considered, and $P_{DM}(S=4) \times 1.26$ is 1 dB over $P_{DM}(S=4)$.

Figure 5A:
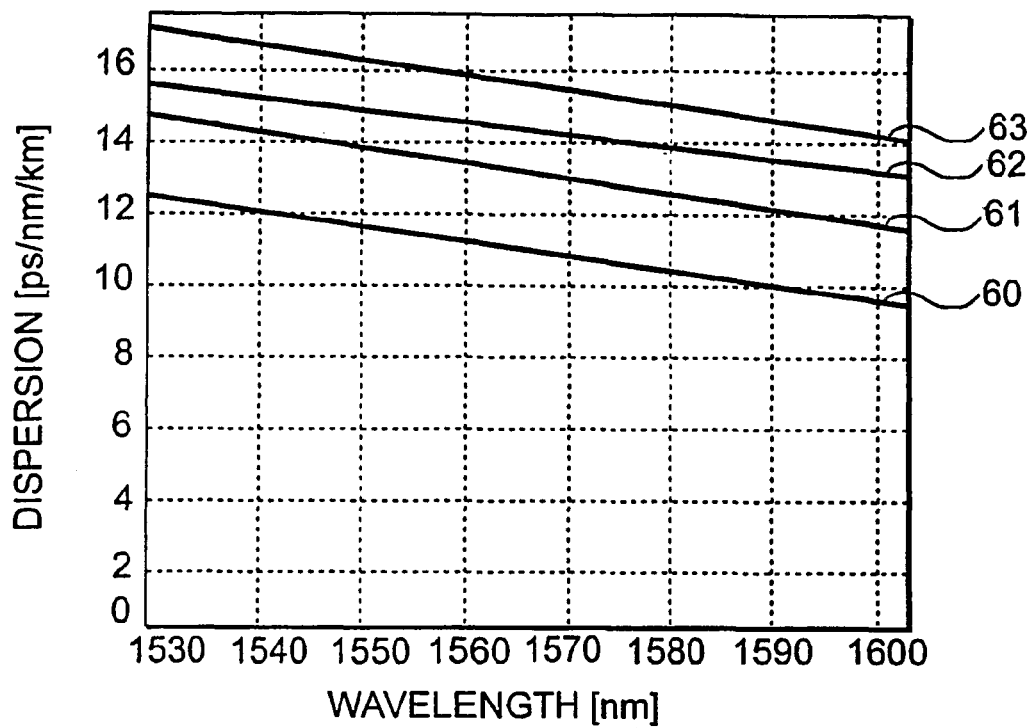
FIGS. 5A–B are graphs of dispersion versus wavelength for a positive dispersion and negative dispersion fiber, respectively, with variations of average GVD of 0.5 ps$^2$/km and of soliton power of 1 dB consistent with a first group of embodiments of the present invention.
Figure 5B:
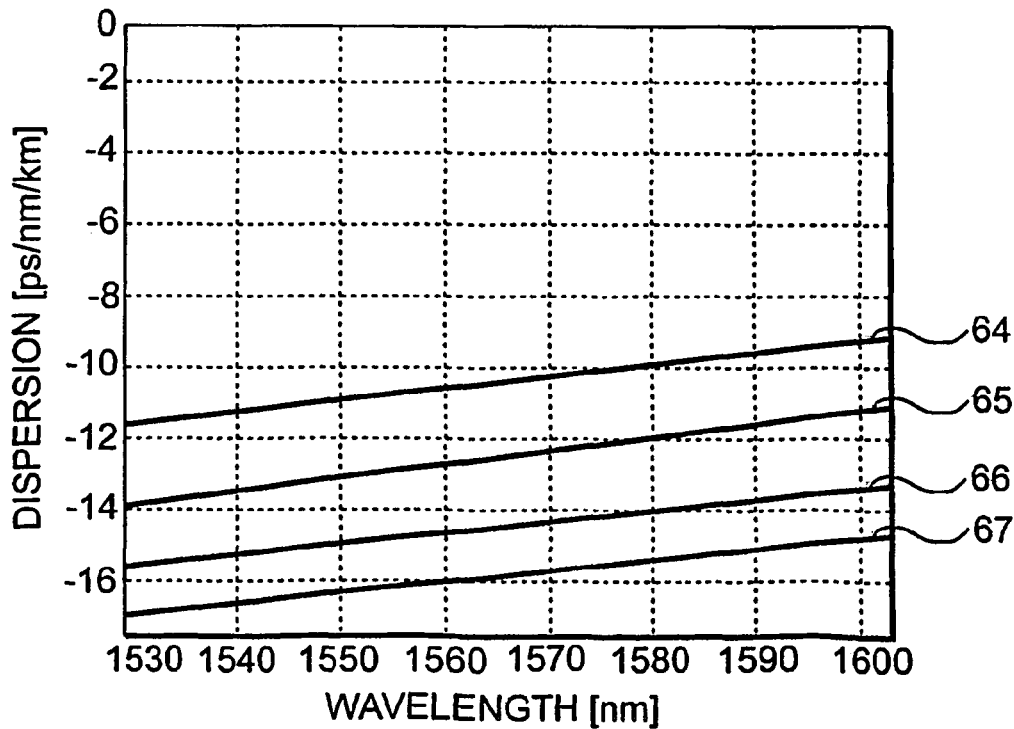

FIGS. 5A–B illustrate the dispersion versus wavelength characteristics for a first group of embodiments of the present invention having a first optical fiber of a positive dispersion with a negative slope and a second optical fiber of a negative dispersion with a positive slope. In these embodiments, a symmetrical dispersion managed optical soliton transmission system (such as 10 in FIG. 1) comprises alternating spans of optical fiber 15 respectively having lengths $L_1$ and $L_2$, where all of the lengths are substantially equal to about 50 km. Consequently, the map period $L_P$ for the embodiments shown is about 100 km, which equals the amplifier spacing $L_A$, as shown above in Table 1.

The four curves 60 to 63 plotted in FIG. 5A show the dispersion characteristics for the four combinations of soliton power $P_{DM}$ and average group velocity dispersion $\beta_{ave}$ according to a), b), c), d) cases above explained, for exemplary positive dispersion fibers. The four curves 64 to 67 in FIG. 5B show the dispersion characteristics for the same combinations of soliton power $P_{DM}$ and average group velocity dispersion $\beta_{ave}$ for exemplary companion negative dispersion fibers. The following table shows to which case a), b), c), d) the different curves refer to.

| Curves | Case |
|---|---|
| 60, 64 | a) |
| 61, 65 | b) |
| 62, 66 | c) |
| 63, 67 | d) |

As can be seen from FIGS. 5A and 5B, the four curves 60, 64, 63, and 67 determine a sort of inferior and superior boundaries (relative to the absolute value of dispersion and soliton power chosen) of the regions of useful positive and negative dispersion. Values for the positive dispersion fiber range from about 17.5 ps/nm/km to about 9.5 ps/nm/km, while the negative dispersion values range from about −17.5 ps/nm/km to about −9 ps/nm/km across the wavelength range. A fiber manufactured with its dispersion curve lying between curves 60 and 63 or 64 and 67 and a companion fiber with related dispersion according to equation (7) can be combined in a soliton transmission system to achieve soliton power variation substantially within 1 dB over the whole amplification wavelength range and an average dispersion absolute value less than about 0.5 ps²/km. More preferred ranges for the positive dispersion fiber and for the companion negative dispersion fiber are defined between the curves 62–63 and 66–67, respectively, as they refer to average GVD around 0.0 ps²/km. This is advantageous in order to achieve a very low level of jitter together with substantial equalisation of the soliton power-per-channel.

The two regions of the dispersion-wavelength plots of FIGS. 5A–B are linked by a biunivocal correspondence established by relation (7). The shape of the combined region is similar to a parallelogram having top and bottom sides having a negative slope for positive dispersion values and having a positive slope for negative dispersion values. This peculiar orientation sets a general average trend for the dispersion curves of the two fibers constituting the map: the positive dispersion one should have a negative dispersion slope, while the negative dispersion one should have a positive dispersion slope. In other words, the dispersion difference between the two fibers should decrease with increasing wavelength. In Applicants' opinion, this condition is associated with the fact that the average fiber nonlinearity coefficient decreases with wavelength. The decreasing nonlinearity coefficient in the wavelength range affects the soliton power-per-channel, so that the product ($P_{DM} \cdot \gamma_{ave}$) is substantially constant in the wavelength range, the other parameters of the system (e.g. S, $\beta_{2ave}$, $F_{pem}$) being constant with wavelength. Thus, a decreasing fiber nonlinearity coefficient with wavelength can cause a respective growing of the soliton power-per-channel. A counteracting of this trend can be set by choosing the fibers of the system so that they have a mutual dispersion difference decreasing with wavelength, that compensates for the growing of the soliton power-per-channel. A decreasing dispersion difference between the two fibers of the dispersion managed system can be also seen as a decreasing map strength $S(\lambda)$ with wavelength of the system.

The slopes of the positive dispersion fibers shown in FIG. 5A are comprised between about −0.04 and −0.031 ps/nm²/km. The slopes of the negative dispersion fibers shown in FIG. 5B are comprised between about 0.031 and 0.039 ps/nm²/km.

It has to be understood that the dispersion curves plotted in FIGS. 5A–5B are representative of fibers suitable for the employment in a dispersion managed soliton system within a specified range of power-per-channel. In the case a higher power-per-channel is desired, the corresponding dispersion curves would be displaced in regions of higher dispersion absolute values. Guidance for determining the suitable dispersion curves can still be found in eq.(7). As it will be clarified in the following, Applicants have found that the more the power-per-channel is increased, the more the slope of both fibers should be increased (in absolute value), in order to maintain equalisation of the power-per-channel and low global average GVD.

It has also to be understood that for another value of the amplifier spacing $L_A$, with the same map period length $L_P$, the dispersion curves of the fibers can be the same of FIGS. 5A–5B, provided that the power-per-channel has to be varied, in accordance to the variation of the pre-emphasis factor $F_{pem}$.

Figure 6A:
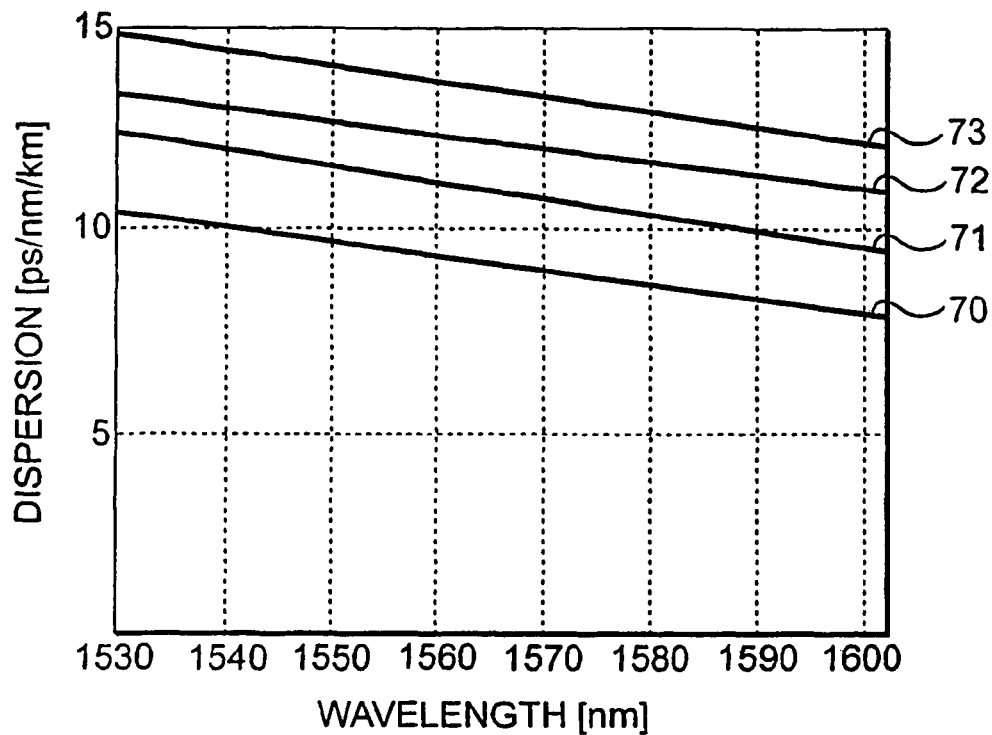
FIGS. 6A–B are graphs of dispersion versus wavelength for a positive dispersion and negative dispersion fiber, respectively, with variations of average GVD of 0.5 ps$^2$/km and of soliton power of 1 dB consistent with a second group of embodiments of the present invention.
Figure 6B:
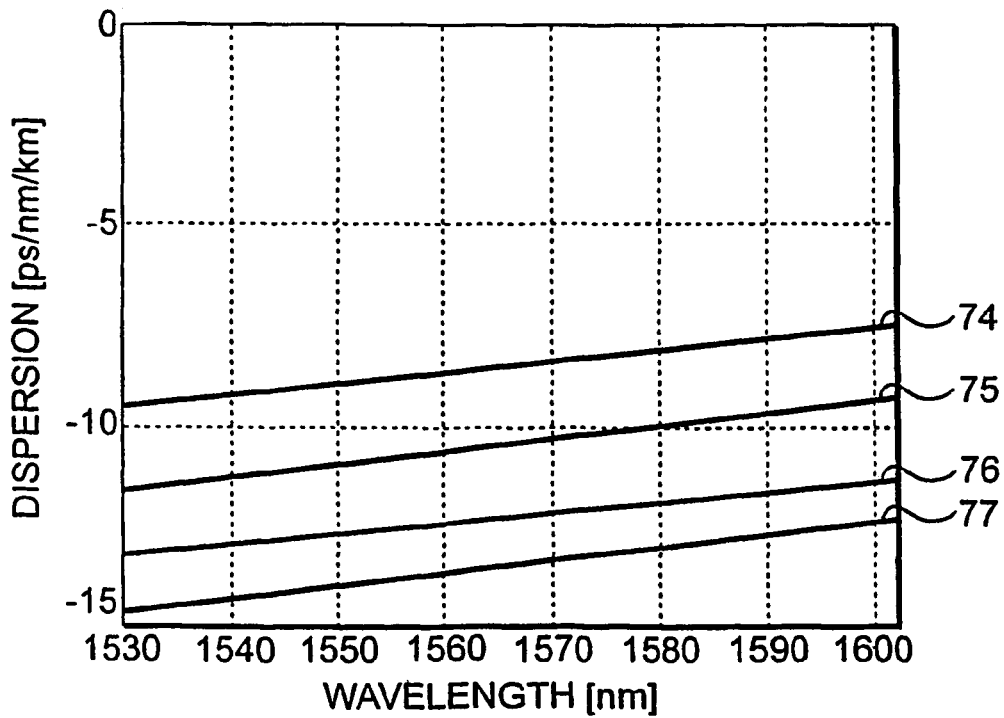

In a second group of exemplary embodiments of the present invention, alternating fiber spans having positive and negative dispersion for a symmetrical dispersion managed optical soliton communication system each have a length of about 60 km. Consequently, the map period for the second embodiment is 120 km. FIGS. 6A and 6B illustrate the dispersion characteristics across the wavelength range for these fiber lengths with a variation of soliton power of within about 1 dB between solitons and a maximum absolute value of of GVD of about 0.5 ps²/km, according to the cases a), b), c), d) above explained. The following table shows to which case a), b), c), d) the different curves refer to.

| Curves | Case |
|--------|------|
| 70, 74 | a) |
| 71, 75 | b) |
| 72, 76 | c) |
| 73, 77 | d) |

In this instance, the longer fiber lengths compared with the first embodiment result in slightly lower absolute values of dispersion. FIGS. 6A–B show a range of positive dispersion from about 15 ps/nm/km to about 7.5 ps/nm/km and a range of negative dispersion from about −14.5 ps/nm/km to about −7.5 ps/nm/km. The slopes of the positive dispersion fibers shown in FIG. 6A are comprised between about −0.035 and −0.027 ps/nm²/km. The slopes of the negative dispersion fibers shown in FIG. 5B are comprised between about 0.027 and 0.034 ps/nm²/km.

Figure 7A:
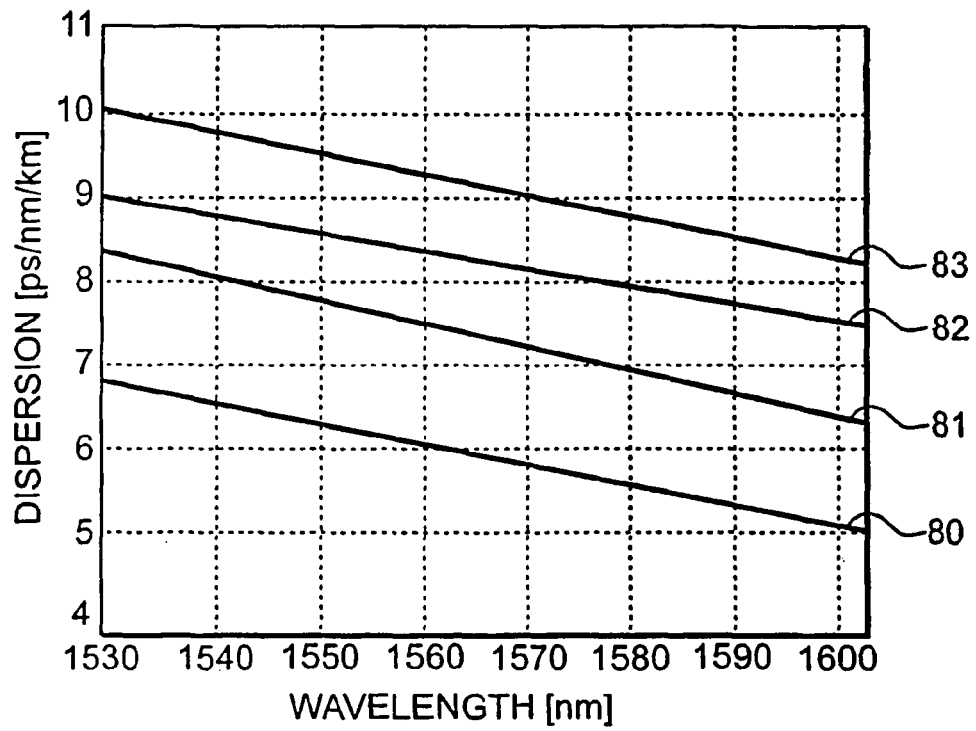
FIGS. 7A–B are graphs of dispersion versus wavelength for a positive dispersion and negative dispersion fiber, respectively, with variations of average GVD of 0.5 ps$^2$/km and of soliton power of 1 dB consistent with a third group of embodiments of the present invention.
Figure 7B:
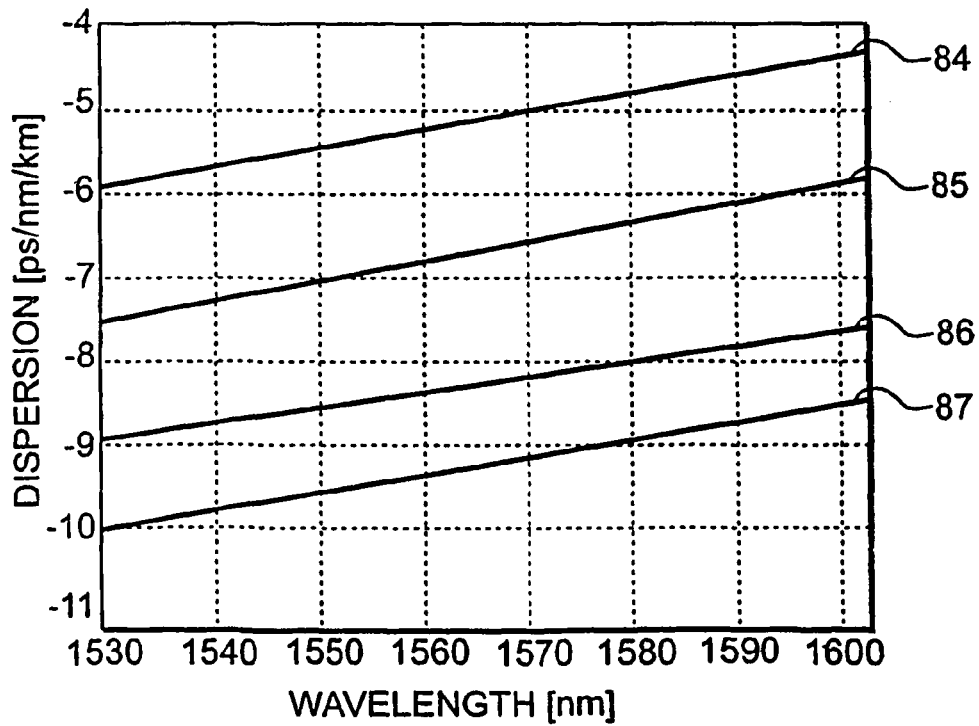

In a third group of exemplary embodiments of the present invention, a symmetrical dispersion-managed optical soliton system that has a longer map period of 200 km, with positive dispersion fiber of 100 km and negative dispersion fiber also of 100 km, was considered. FIGS. 7A and 7B illustrate the dispersion performance for the third group of embodiments of the present invention. The following table shows to which case a), b), c), d) the different curves refer to.

| Curves | Case |
|--------|------|
| 80, 84 | a) |
| 81, 85 | b) |
| 82, 86 | c) |
| 83, 87 | d) |

The longer lengths of spans in the third group of embodiments results in lower absolute values of dispersion for the fibers compared with the previous embodiments. The positive dispersion values range from about 10 ps/nm/km to about 5 ps/nm/km, while the negative dispersion values are between about −10 ps/nm/km and −4.2 ps/nm/km. The slopes of the positive dispersion fibers shown in FIG. 7A are comprised between about −0.026 and −0.019 ps/nm²/km. The slopes of the negative dispersion fibers shown in FIG. 7B are comprised between about 0.019 and 0.025 ps/nm²/km.

Figure 8A:
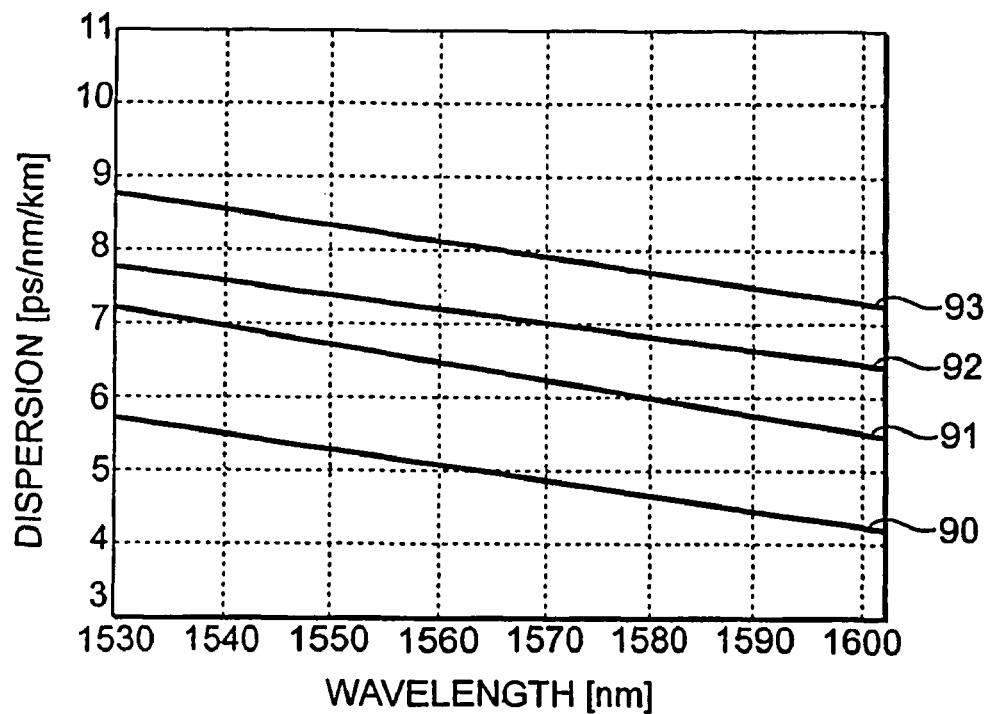
FIGS. 8A–B are graphs of dispersion versus wavelength for a positive dispersion and negative dispersion fiber, respectively, with variations of average GVD of 0.5 ps$^2$/km and of soliton power of 1 dB consistent with a fourth group of embodiments of the present invention.
Figure 8B:
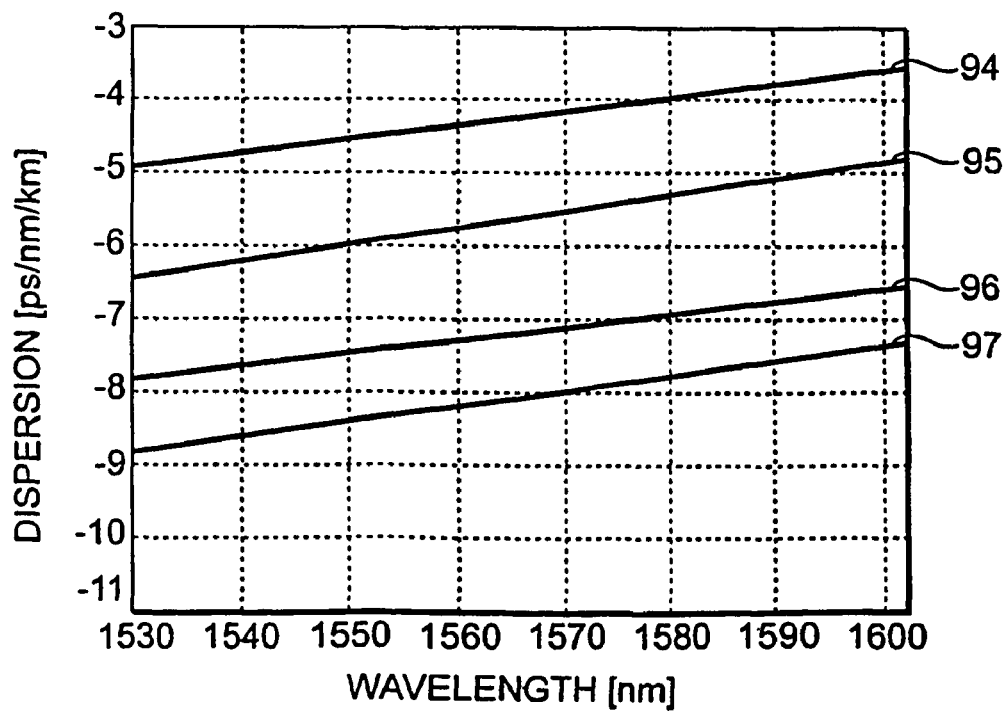

A fourth group of exemplary embodiments of the present invention considers a symmetrical dispersion-managed optical soliton system that has a map period of 240 km, with positive dispersion fiber of 120 km and negative dispersion fiber also of 120 km. FIGS. 8A and 8B show the dispersion performance. The following table shows to which case a), b), c), d) the different curves refer to.

| Curves | Case |
|--------|------|
| 90, 94 | a) |
| 91, 95 | b) |
| 92, 96 | c) |
| 93, 97 | d) |

The positive dispersion values ranged from around 8.8 ps/nm/km to about 4.2 ps/nm/km. The negative dispersion values were between about −8.8 ps/nm/km and −3.5 ps/nm/km. The slopes of the positive dispersion fibers shown in FIG. 8A are comprised between about −0.023 and −0.017 ps/nm²/km. The slopes of the negative dispersion fibers shown in FIG. 8B are comprised between about 0.017 and 0.022 ps/nm²/km.

Figure 9A:
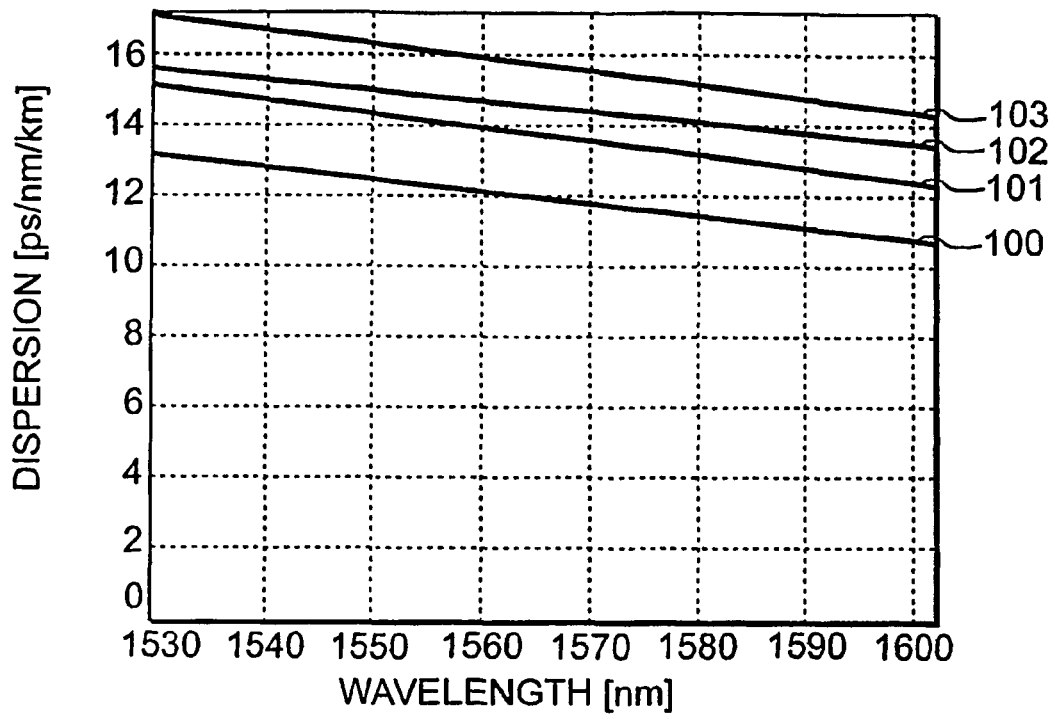
FIGS. 9A–B are graphs of dispersion versus wavelength for a positive dispersion and negative dispersion fiber, respectively, with variations of average GVD of 0.5 ps$^2$/km and of soliton power of 1 dB consistent with a fifth group of embodiments of the present invention.
Figure 9B:
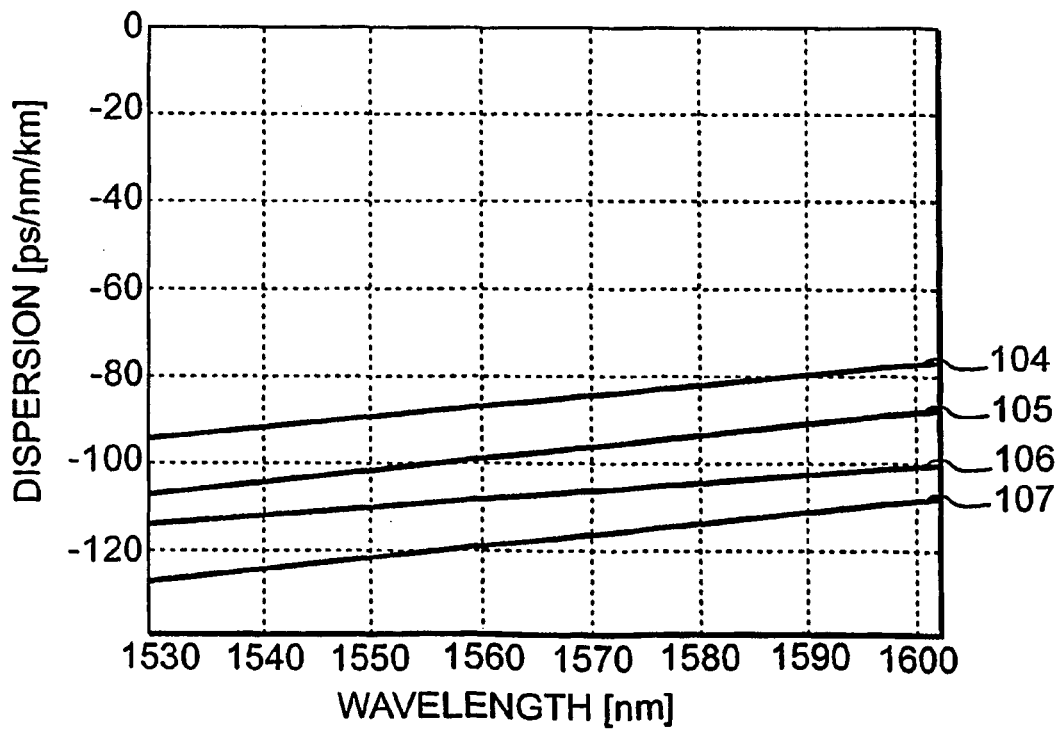

In contrast to the previous embodiments, a fifth group of embodiments of the present invention considers a dispersion-managed optical soliton system with positive dispersion fiber of a negative slope and negative dispersion fiber of a positive slope where the map is asymmetrical, i.e. where $L_1$ is not equal to $L_2$. In this embodiment, $L_1$ has a length of 44 km, while $L_2$ is only 6 km long. Consequently, $L_2$ has a strong negative dispersion. FIGS. 9A and 9B illustrate the positive and negative dispersion characteristics for these two fiber spans. The following table shows to which case a), b), c), d) the different curves refer to.

| Curves | Case |
|--------|------|
| 100, 104 | a) |
| 101, 105 | b) |
| 102, 106 | c) |
| 103, 107 | d) |

FIG. 9B shows the high negative dispersion value attributed to the short negative dispersion fiber for this line. The negative values are about −125 ps/nm/km to about −75 ps/nm/km. The positive dispersion fiber in FIG. 9A, on the other hand, has values from around 17 ps/nm/km to around 11 ps/nm/km. The slopes of the positive dispersion fibers shown in FIG. 9A are comprised between about −0.037 and −0.034 ps/nm²/km. The slopes of the negative dispersion fibers shown in FIG. 9B are comprised between about 0.217 and 0.269 ps/nm²/km.

Figure 10A:
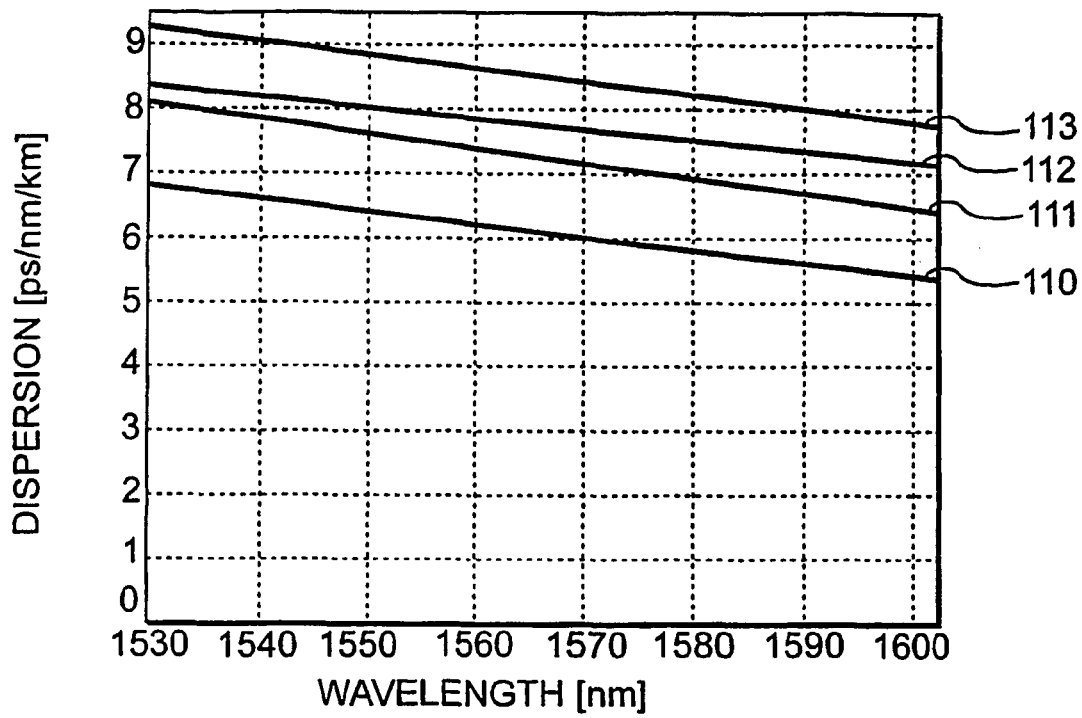
FIGS. 10A–B are graphs of dispersion versus wavelength for a positive dispersion and negative dispersion fiber, respectively, with variations of average GVD of 0.5 ps$^2$/km and of soliton power of 1 dB consistent with a sixth group of embodiments of the present invention.
Figure 10B:
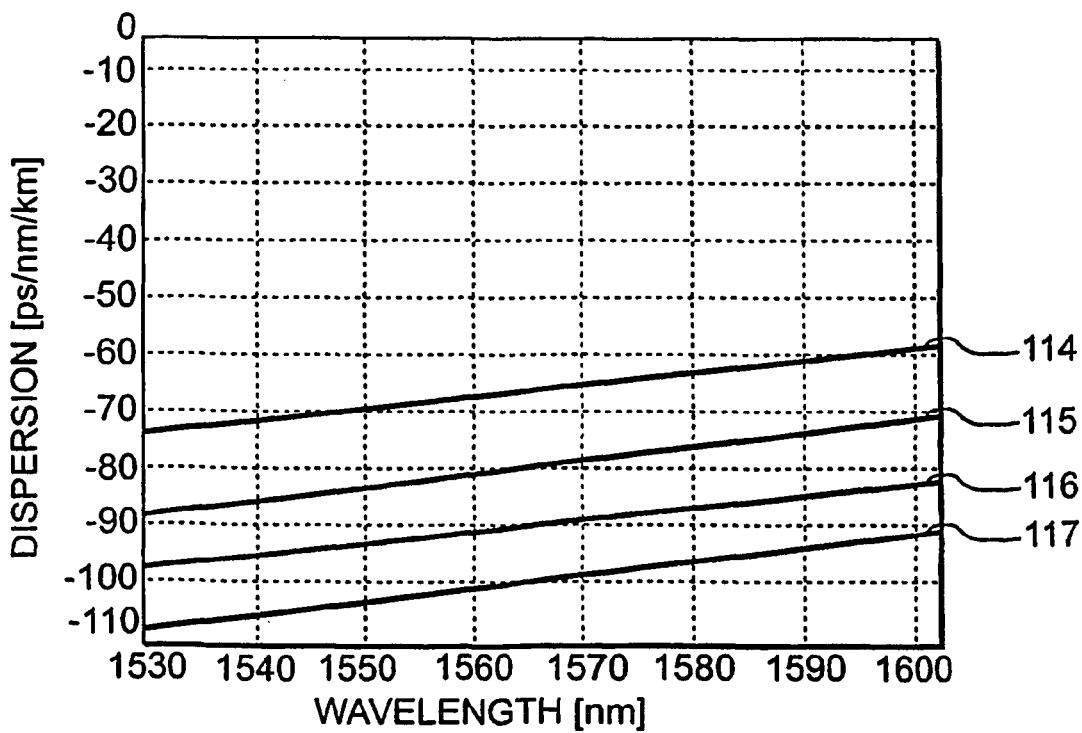

FIGS. 10A and 10B show a sixth group of exemplary embodiments of the present invention for a set of dispersion-managed fibers having an asymmetrical map where one of the fibers has a strong negative dispersion. In these embodiments, $L_1$ has a length of 92 km, while $L_2$ is 8 km long. FIGS. 10A and 10B illustrate the positive and negative dispersion characteristics for these two fiber spans. The following table shows to which case a), b), c), d) the different curves refer to.

| Curves | Case |
|---|---|
| 110, 114 | a) |
| 111, 115 | b) |
| 112, 116 | c) |
| 113, 117 | d) |

As can be seen from FIGS. 10A–B, the dispersion values for these embodiments cover about 9.3 ps/nm/km to about 5.3 ps/nm/km for the positive dispersion and negative slope fiber, and about −109 ps/nm/km to about −58 ps/nm/km for the negative dispersion and positive slope fiber. The slopes of the positive dispersion fibers shown in FIG. 10A are comprised between about −0.022 and −0.017 ps/nm²/km. The slopes of the negative dispersion fibers shown in FIG. 5B are comprised between about 0.194 and 0.246 ps/nm²/km.

Figure 11A:
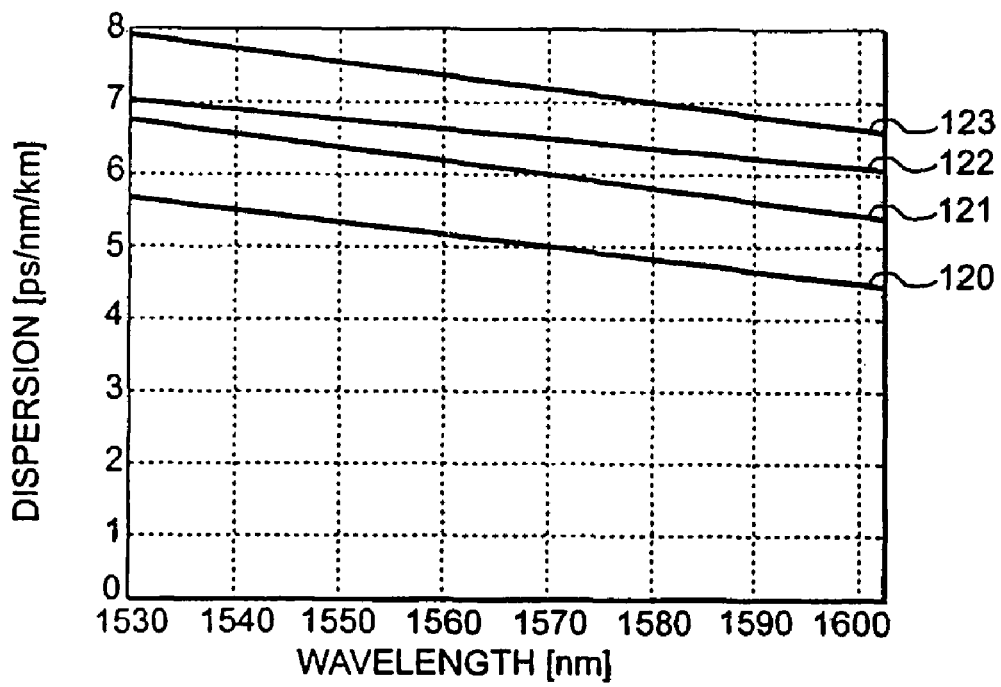
FIGS. 11A–B are graphs of dispersion versus wavelength for a positive dispersion and negative dispersion fiber, respectively, with variations of average GVD of 0.5 ps$^2$/km and of soliton power of 1 dB consistent with a seventh group of embodiments of the present invention.
Figure 11B:
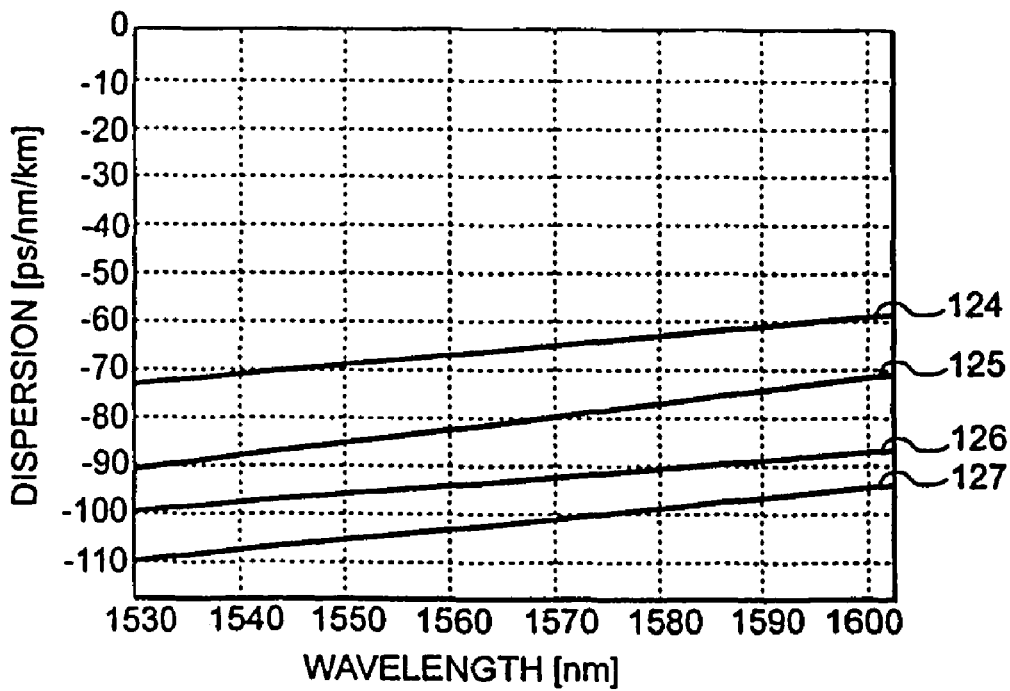

FIGS. 11A and 11B show another selection of optical performances for spans of dispersion-managed fiber, where the map is asymmetrical. In this seventh group of exemplary embodiments, $L_1$ has a length of 112 km, while $L_2$ is 8 km long. FIGS. 11A and 11B illustrate the positive and negative dispersion characteristics for these two fiber spans. The following table shows to which case a), b), c), d) the different curves refer to.

| Curves | Case |
|---|---|
| 120, 124 | a) |
| 121, 125 | b) |
| 122, 126 | c) |
| 123, 127 | d) |

The fibers in these embodiments respectively have dispersion values of about 8 ps/nm/km to about 4.5 ps/nm/km and −110 ps/nm/km to −58 ps/nm/km. The slopes of the positive dispersion fibers shown in FIG. 11A are comprised between about −0.019 and −0.015 ps/nm²/km. The slopes of the negative dispersion fibers shown in FIG. 11B are comprised between about 0.204 and 0.261 ps/nm²/km.

Figure 12A:
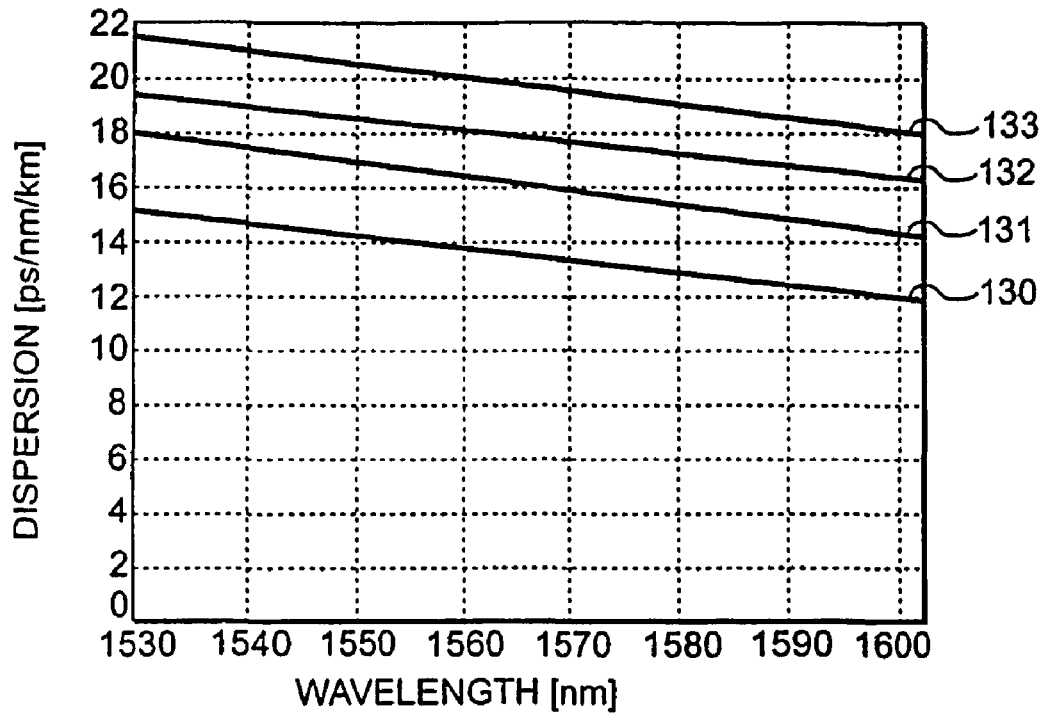
FIGS. 12A–B are graphs of dispersion versus wavelength for a positive dispersion and negative dispersion fiber, respectively, with variations of average GVD of 0.5 ps$^2$/km and of soliton power of 1 dB consistent with an eighth group of embodiments of the present invention.
Figure 12B:
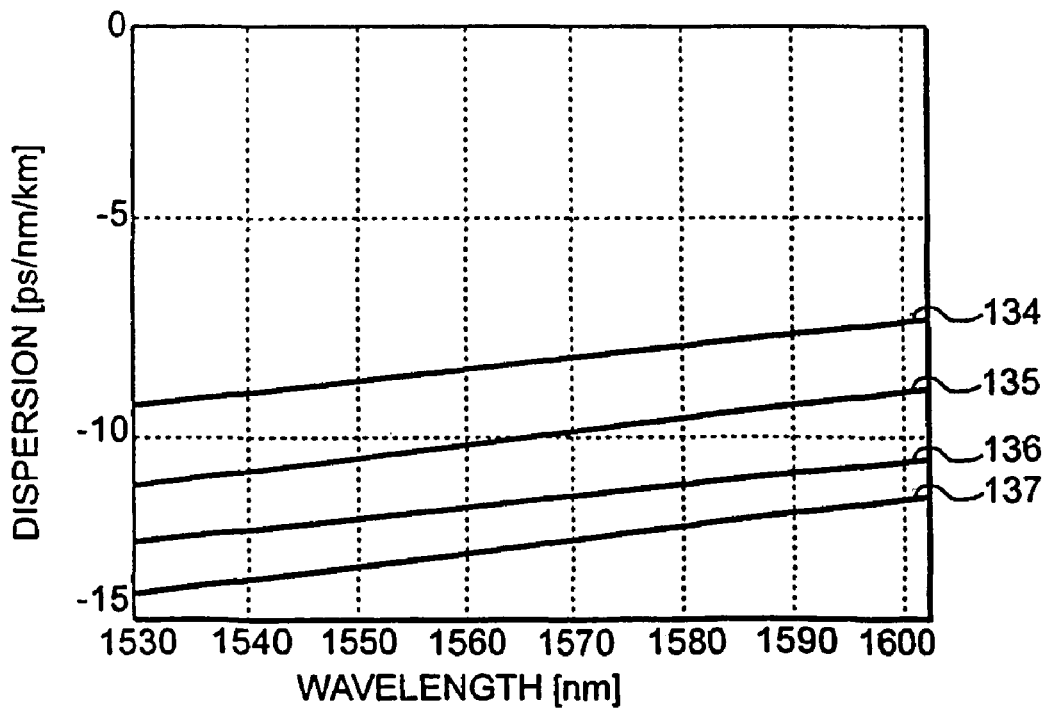

FIGS. 12A–B and 13A–B illustrate plots of dispersion characteristics for eighth and ninth groups of exemplary embodiments of the present invention where the map is asymmetrical with $L_2$ being longer than $L_1$. The fiber with length $L_1$ has strong positive dispersion. FIGS. 12A and 12B show the positive and negative dispersion characteristics $L_1$ being 40 km and $L_2$ being 60 km. The following table shows to which case a), b), c), d) the different curves refer to.

| Curves | Case |
|---|---|
| 130, 134 | a) |
| 131, 135 | b) |
| 132, 136 | c) |
| 133, 137 | d) |

Figure 13A:
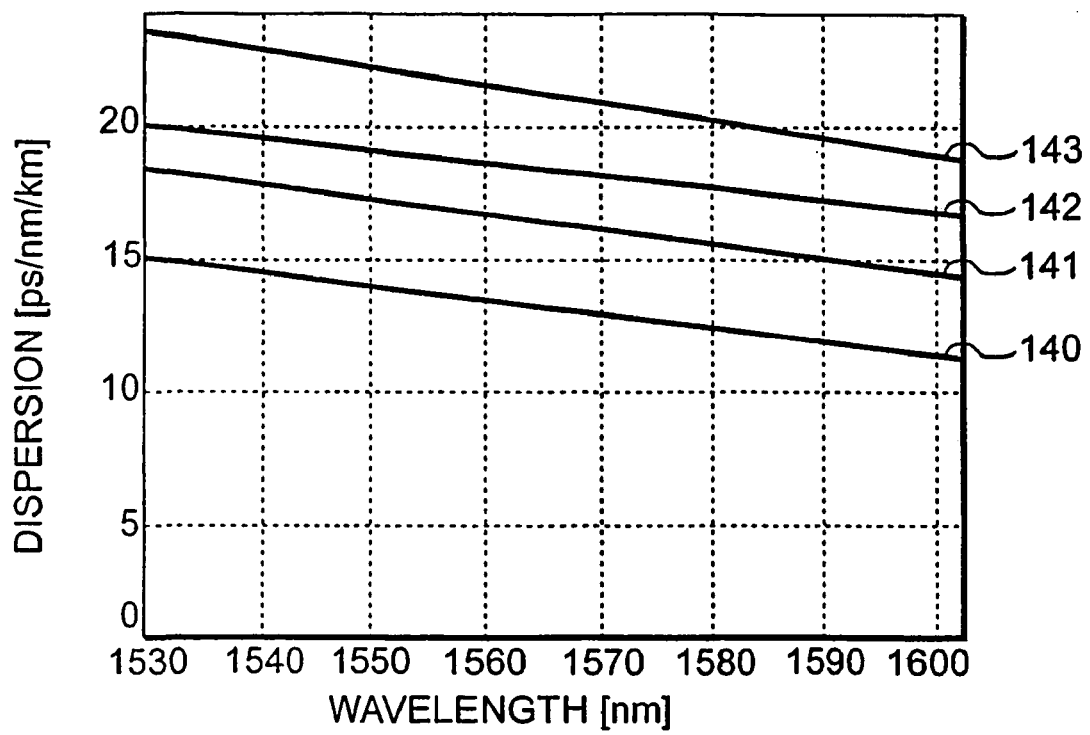
FIGS. 13A–B are graphs of dispersion versus wavelength for a positive dispersion and negative dispersion fiber, respectively, with variations of average GVD of 0.5 ps$^2$/km and of soliton power of 1 dB consistent with a ninth group of embodiments of the present invention.
Figure 13B:
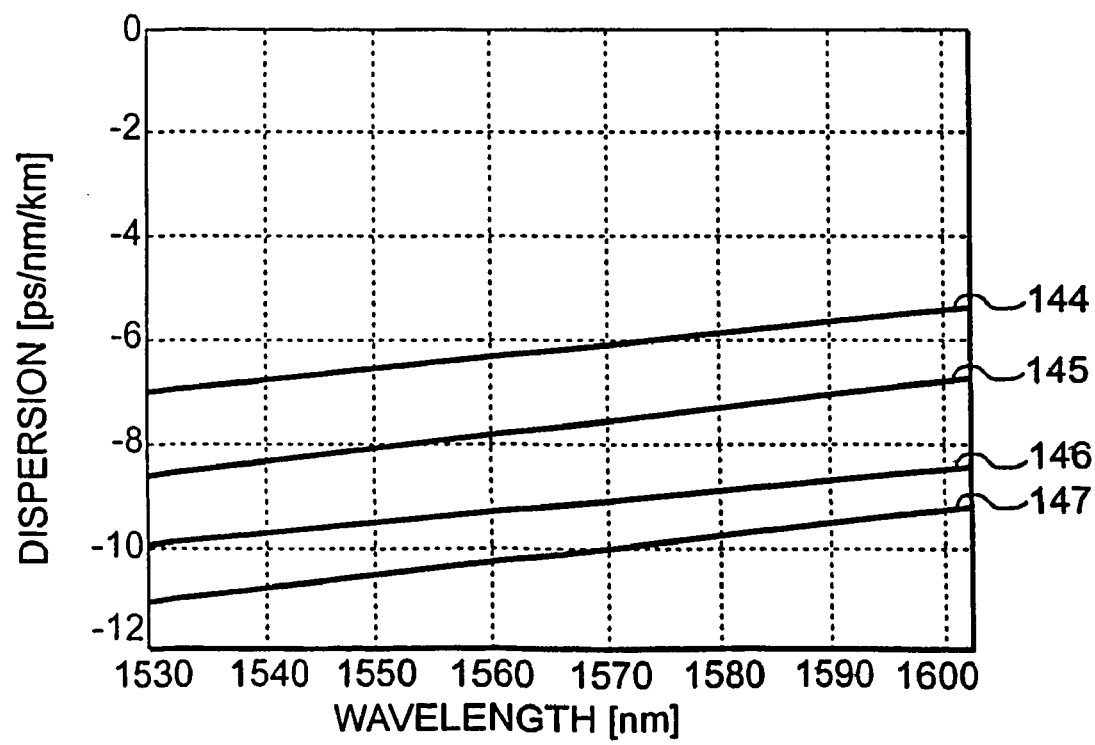
Figure 14:
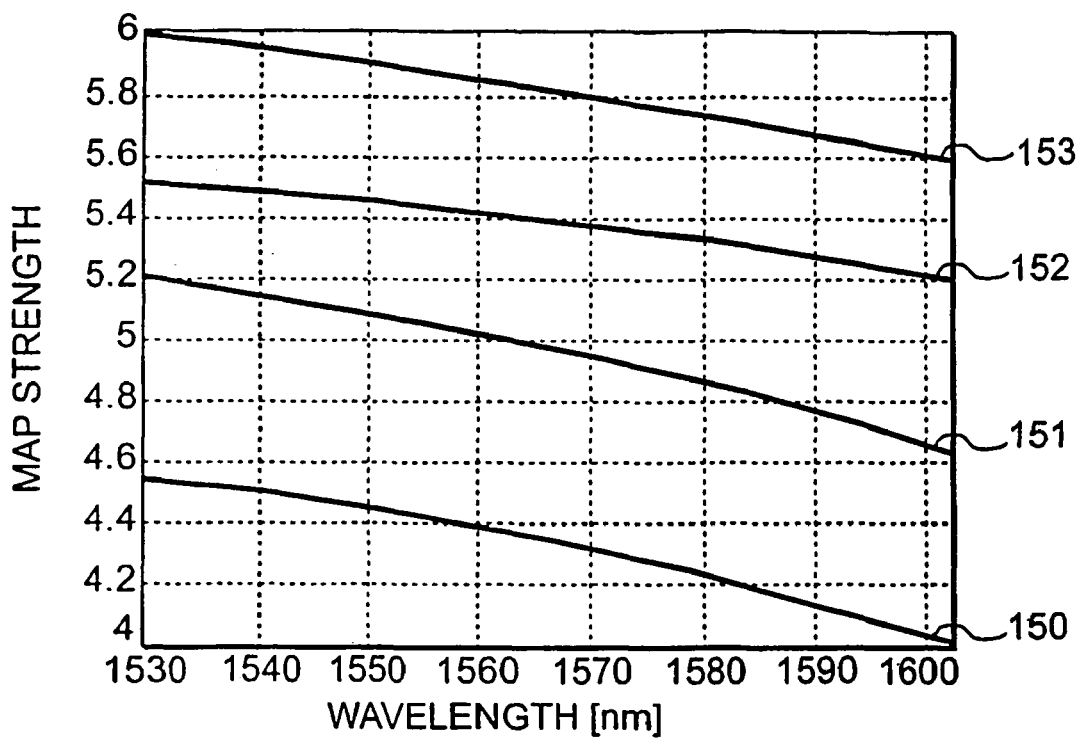
FIG. 14 is a graph of map strength versus wavelength for the fifth group of embodiments of the present invention.
Figure 15:
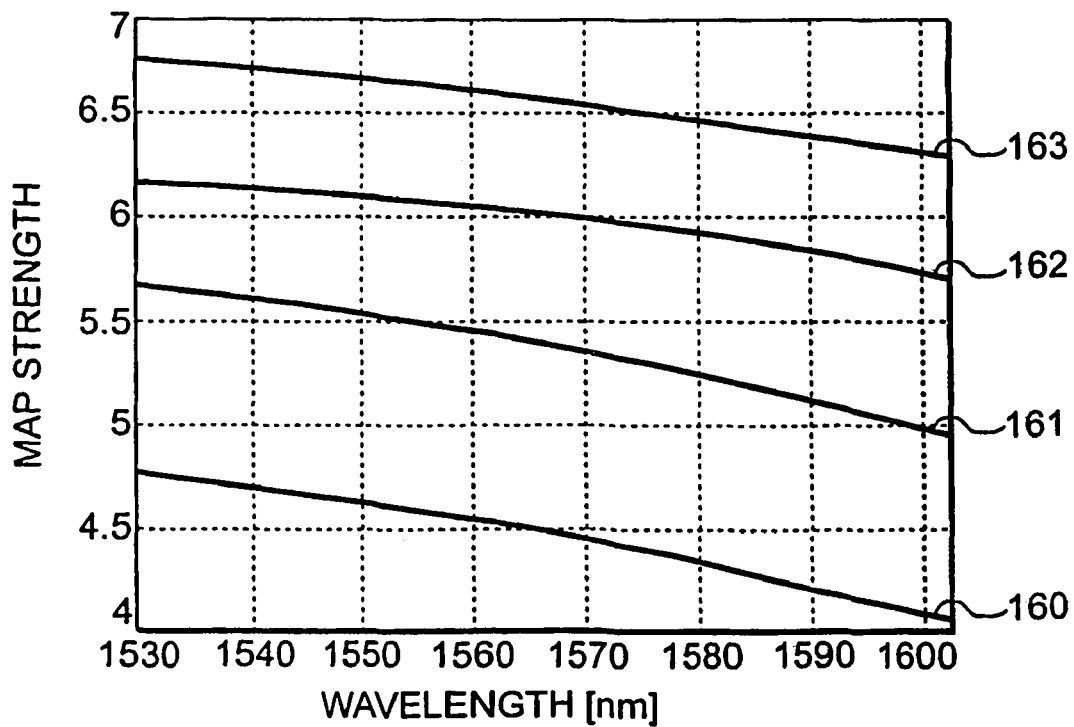
FIG. 15 is a graph of map strength versus wavelength for the first, sixth and eighth groups of embodiments of the present invention.
Figure 16:
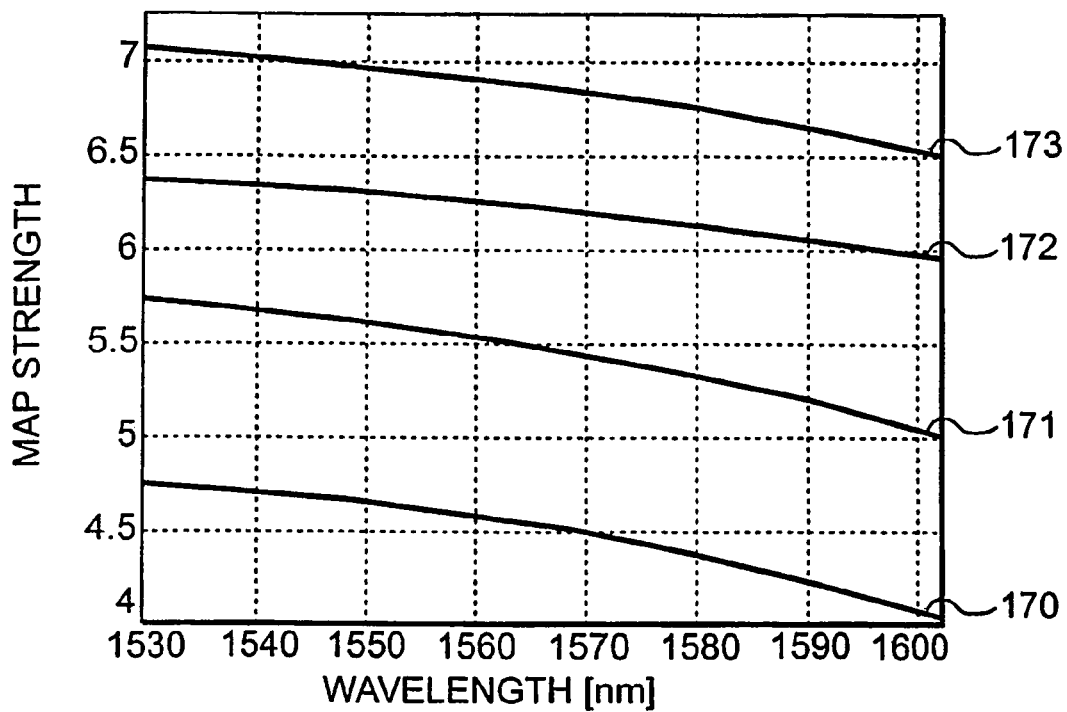
FIG. 16 is a graph of map strength versus wavelength for the second, seventh and ninth groups of embodiments of the present invention.
Figure 17:
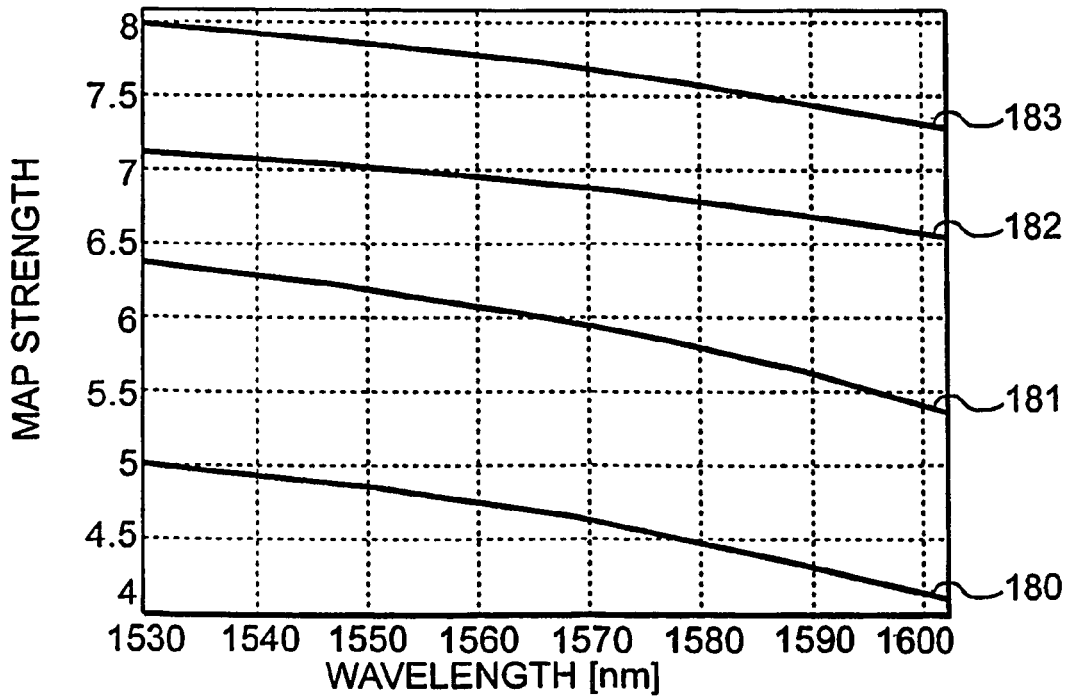
FIG. 17 is a graph of map strength versus wavelength for the third group of embodiments of the present invention.
Figure 18:
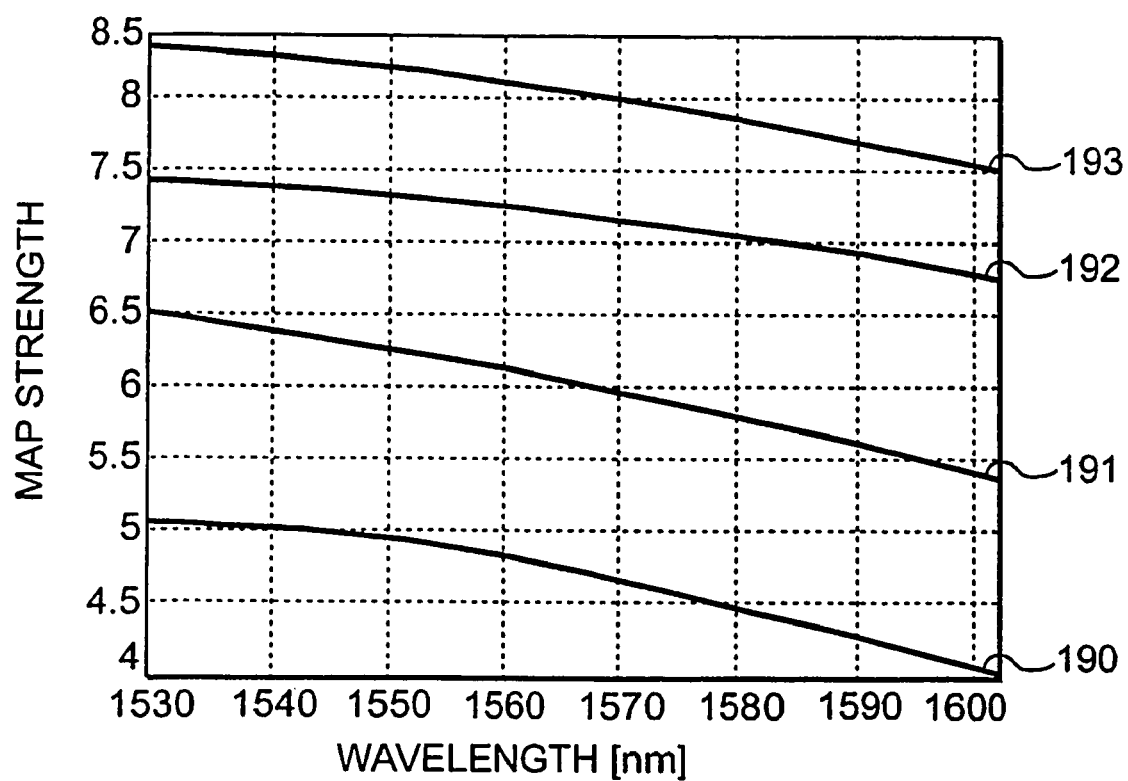
FIG. 18 is a graph of map strength versus wavelength for the fourth group of embodiments of the present invention.

FIGS. 13A and 13B show the respective positive and negative dispersion when $L_1$ was 48 km and $L_2$ was 72 km. The following table shows to which case a), b), c), d) the different curves refer to.

| Curves | Case |
|---|---|
| 140, 144 | a) |
| 141, 145 | b) |
| 142, 146 | c) |
| 143, 147 | d) |

The fibers of FIGS. 12A–B exhibited positive dispersion from 21.5 ps/nm/km to 12 ps/nm/km and negative dispersion from −14 ps/nm/km to −7 ps/nm/km. The slopes of the positive dispersion fibers shown in FIG. 12A are comprised between about −0.050 and −0.039 ps/nm²/km. The slopes of the negative dispersion fibers shown in FIG. 12B are comprised between about 0.026 and 0.032 ps/nm²/km. The fibers of FIGS. 13A–B had positive dispersion from about 22 ps/nm/km to about 12 ps/nm/km and negative dispersion from about −11 ps/nm/km to about −5.5 ps/nm/km. The slopes of the positive dispersion fibers shown in FIG. 13A are comprised between about −0.044 and −0.034 ps/nm²/km. The slopes of the negative dispersion fibers shown in FIG. 13B are comprised between about 0.023 and 0.029 ps/nm²/km.

FIGS. 14 to 18 graph the map strength S versus the wavelength for the embodiments described with reference to FIGS. 5A to 13B, for map periods $L_P$ of 50 km, 100 km, 120 km, 200 km, and 240 km, respectively. For these graphs, the maximum map strength values fall between 6 and 8.5 when the map period $L_P$ varies between 50 km and 240 km. The curves 150–153 in FIG. 14 refer to the map strength obtained with the couples of positive and negative dispersion fibers having dispersion curves reported in FIGS. 9A–9B. The lower curves clearly correspond to the lower dispersion (in absolute value) fibers. The curves 160–163 in FIG. 15 refer to the map strength obtained with the couples of positive and negative dispersion fibers having dispersion curves reported in FIGS. 5A–5B, 10A–10B, 12A–12B. The curves 170–173 in FIG. 16 refer to the map strength obtained with the couples of positive and negative dispersion fibers having dispersion curves reported in FIGS. 6A–6B, 11A–11B, 13A–13B. The curves 180–183 FIG. 17 refer to the map strength obtained with the couples of positive and negative dispersion fibers having dispersion curves reported in FIGS. 7A–7B. The curves 190–193 in FIG. 18 refer to the map strength obtained with the couples of positive and negative dispersion fibers having dispersion curves reported in FIGS. 8A–8B.

As it can be seen in FIGS. 14 to 18 the map strength decreases with wavelength in order to counteract the effect of the nonlinearity coefficient, as previously explained.

Further, the values of map strength increase with increasing map period length. This can limit the total length of a system, as high values of map strength can cause unacceptable bit-error-rate and/or signal-to-noise ratio level in longer systems, due to collisions between adjacent pulses. Accordingly, a shorter map period is thus preferred for long distances (e.g. transoceanic submarine systems), while a longer period can be used for shorter systems (e.g. terrestrial systems). As a general consideration, a smaller $L_P$ is preferred in order to maintain a smaller value of S and to allow the flexibility for longer transmission distances.

The same fibers of the previous embodiments can be used at 40 Gbits/sec rather than at 10 Gbits/sec provided the lengths of each span are reduced approximately by 1/16 and the power per channel is increased approximately 16 times (about +12 dB), in accordance with equations (4) and (7), the other parameters of the system being constant. Short fiber lengths do not represent a severe technical problem but do cause an increase in manufacturing and installation costs. To avoid the use of such short fiber lengths and to maintain the power at lower levels, systems at 40 Gbits/sec can be obtained by lowering the level of dispersion (in absolute value) or by lowering $q_0$. In order to avoid problems due to four-wave mixing, the dispersion of both fibers may be preferably kept higher than about 1.5 ps/nm/km (in absolute value). Alternatively, means for reducing four-wave-mixing can be provided.

Figure 19:
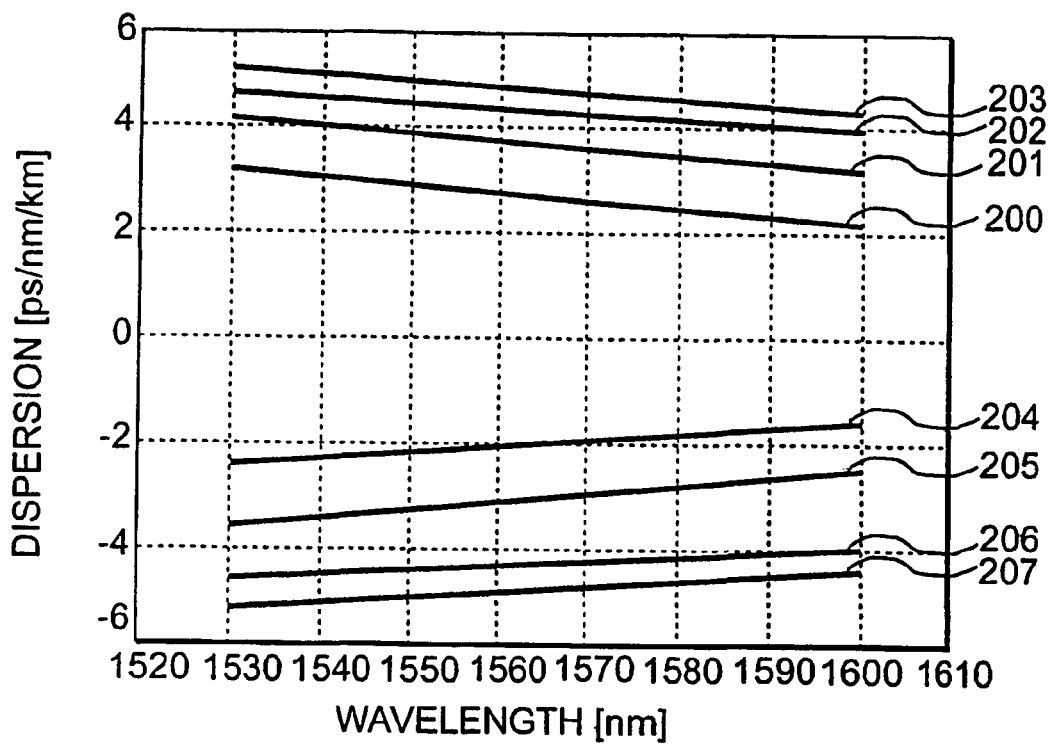
FIG. 19 is a graph of dispersion versus wavelength for a positive dispersion and negative dispersion fiber with variations of average GVD of 0.5 ps$^2$/km and of soliton power of 1 dB consistent with a tenth group of embodiments of the present invention.

FIGS. 19–22 depict four groups of examples of such systems at 40 Gbits/sec using symmetrical maps with a map period varying from 30 to 60 km, further illustrated by the corresponding data in Table 1 (embodiments 10–13). Specifically, FIG. 19 shows the dispersion versus wavelength performance for both positive dispersion ($L_1$=15 km) and negative dispersion ($L_2$=15 km) fibers under the same variations of soliton power and GVD as in the previous embodiments. The dispersion curves of four couples of fibers in a wavelength range between 1530 and 1600 nm are shown in FIG. 19. The amplifier spacing was 90 km. The following table shows to which case a), b), c), d) the different curves refer to.

| Curves | Case |
|---|---|
| 200, 204 | a) |
| 201, 205 | b) |
| 202, 206 | c) |
| 203, 207 | d) |

Figure 20:
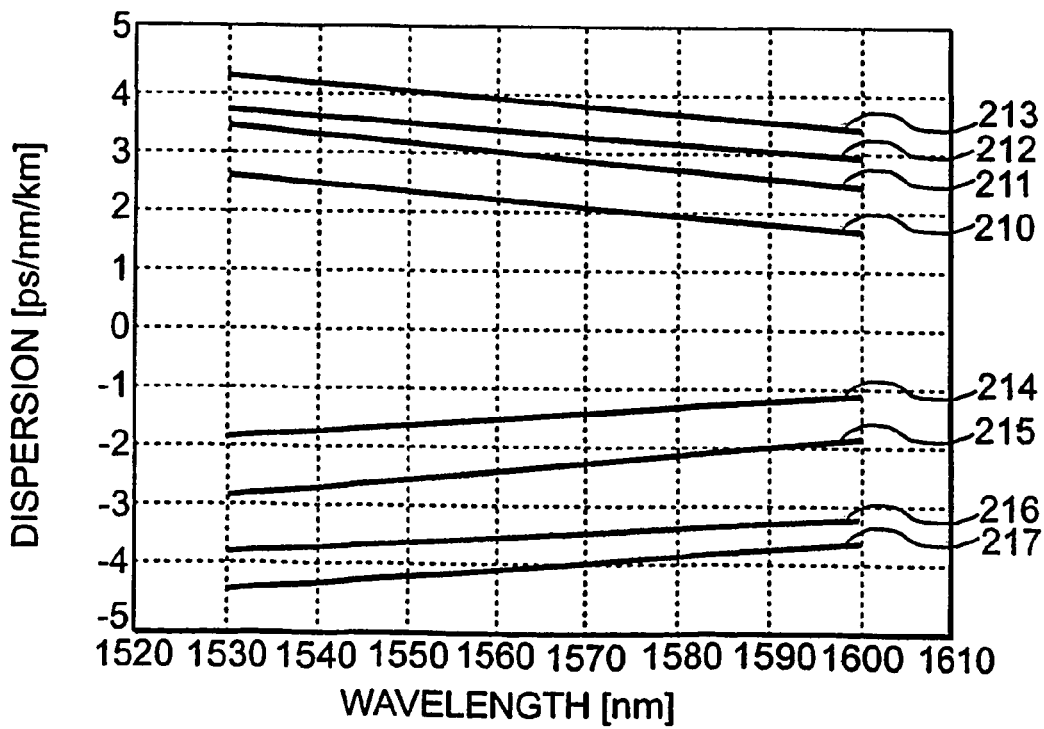
FIG. 20 is a graph of dispersion versus wavelength for a positive dispersion and negative dispersion fiber with variations of average GVD of 0.5 ps$^2$/km and of soliton power of 1 dB consistent with an eleventh group of embodiments of the present invention.

FIG. 20 shows the dispersion characteristics for four couples of positive and negative dispersion fibers both having a length of 20 km and an amplifier spacing of 80 km. The following table shows to which case a), b), c), d) the different curves refer to.

| Curves | Case |
|---|---|
| 210, 214 | a) |
| 211, 215 | b) |
| 212, 216 | c) |
| 213, 217 | d) |

Figure 21:
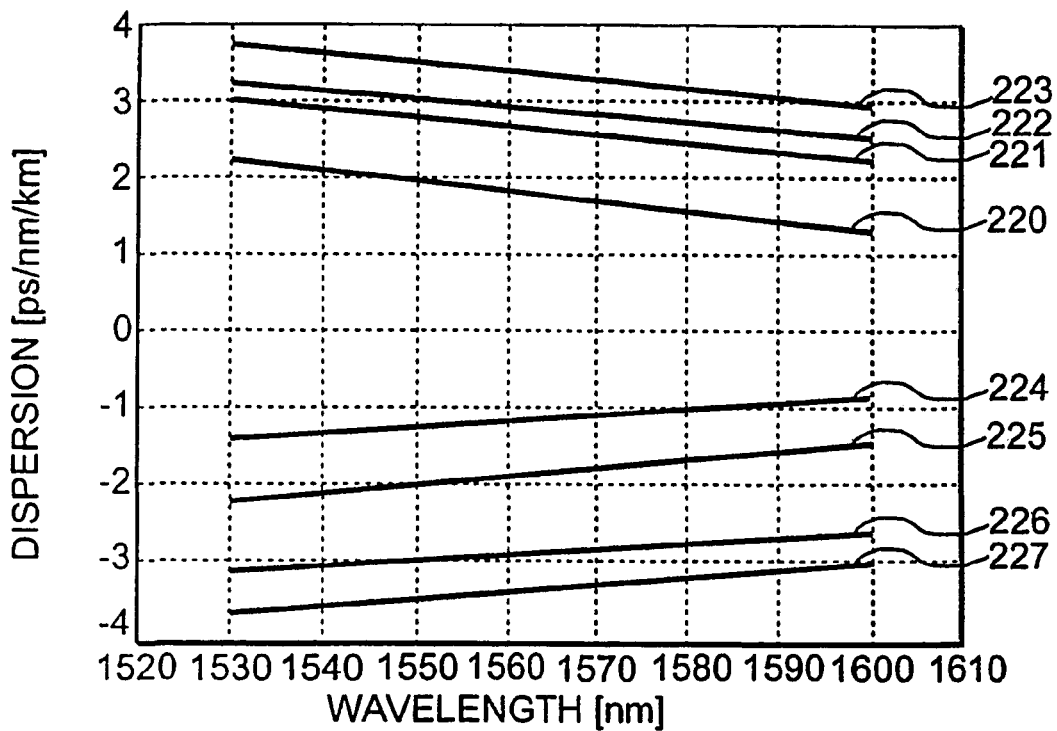
FIG. 21 is a graph of dispersion versus wavelength for a positive dispersion and negative dispersion fiber with variations of average GVD of 0.5 ps$^2$/km and of soliton power of 1 dB consistent with a twelfth group of embodiments of the present invention.

In FIG. 21, the positive and negative dispersion fibers both had a length 25 km, and an amplifier spacing of 100 km. The following table shows to which case a), b), c), d) the different curves refer to.

| Curves | Case |
|---|---|
| 220, 224 | a) |
| 221, 225 | b) |
| 222, 226 | c) |
| 223, 227 | d) |

Figure 22:
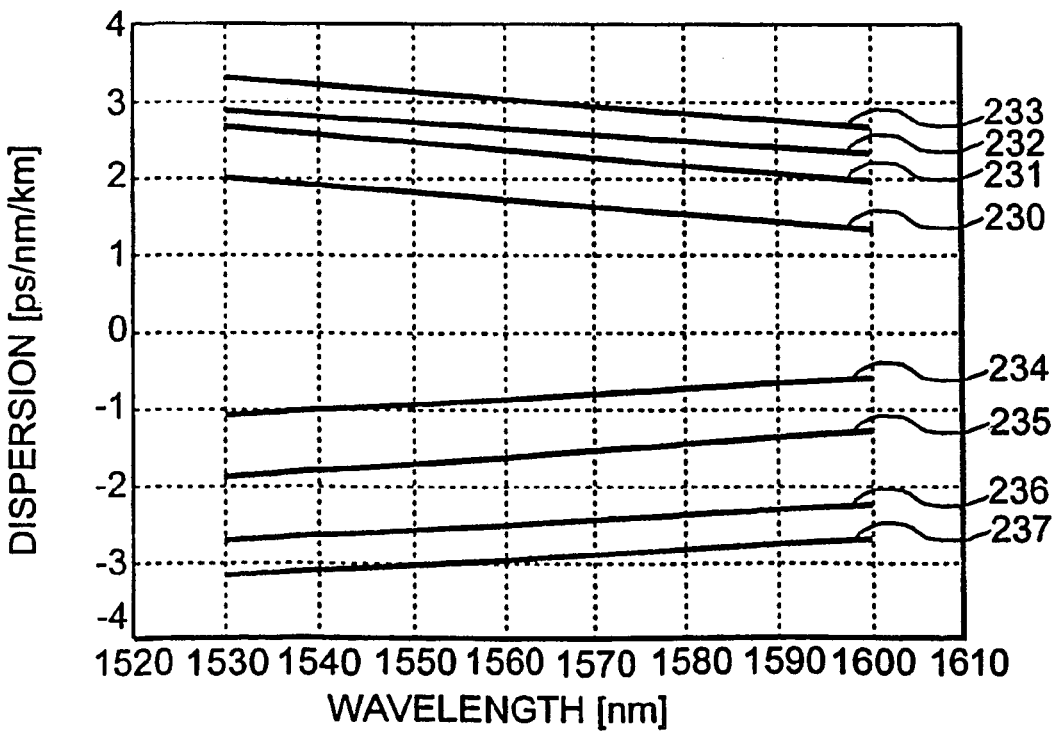
FIG. 22 is a graph of dispersion versus wavelength for a positive dispersion and negative dispersion fiber with variations of average GVD of 0.5 ps$^2$/km and of soliton power of 1 dB consistent with a thirteenth group of embodiments of the present invention.

The positive and negative dispersion fibers that provide the basis for FIG. 22 both had a length of 30 km, and the system had an amplifier spacing of 90 km. The following table shows to which case a), b), c), d) the different curves refer to.

| Curves | Case |
|---|---|
| 230, 234 | a) |
| 231, 235 | b) |
| 232, 236 | c) |
| 233, 237 | d) |

Figure 23:
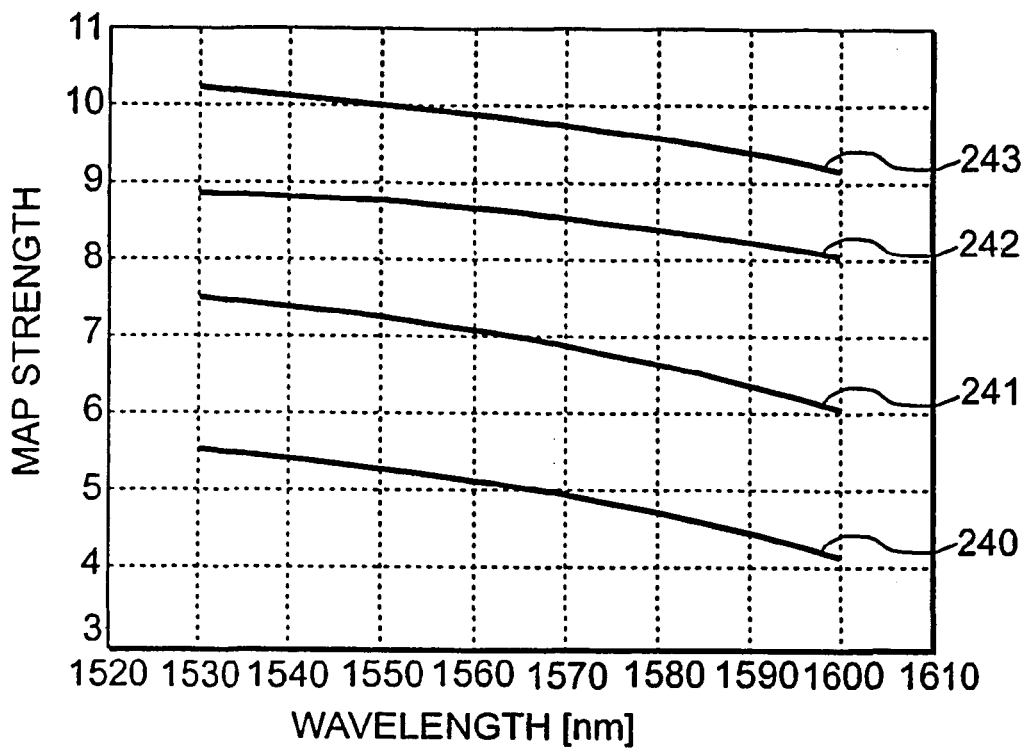
FIG. 23 is a graph of map strength versus wavelength for the tenth group of embodiments of the present invention.
Figure 24:
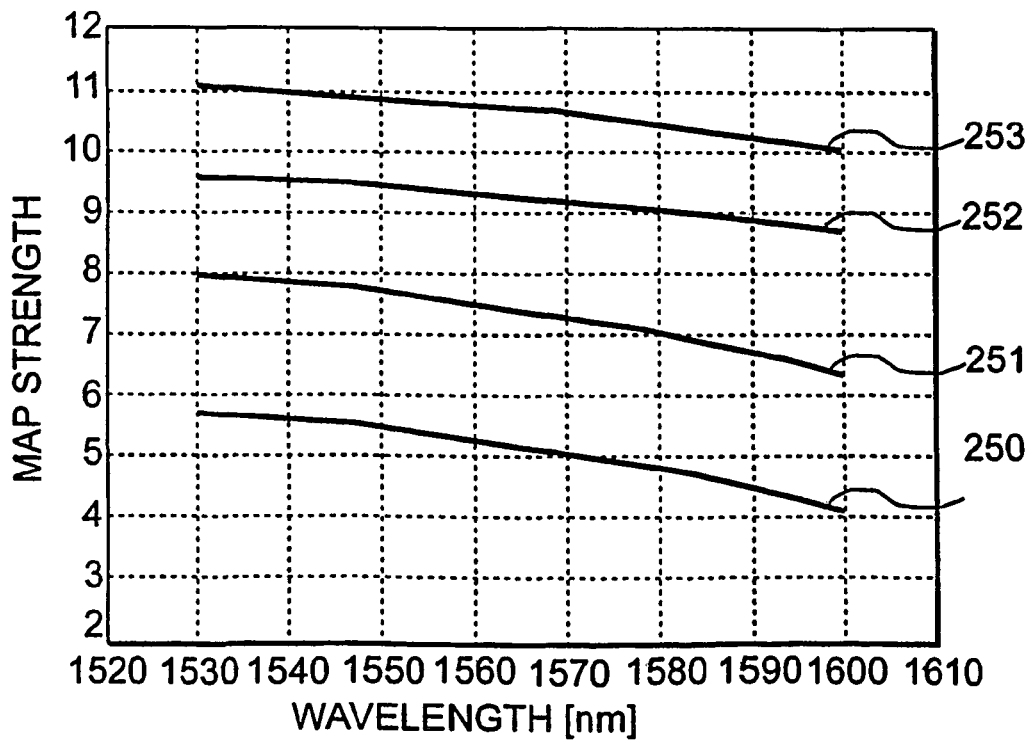
FIG. 24 is a graph of map strength versus wavelength for the eleventh group of embodiments of the present invention.
Figure 25:
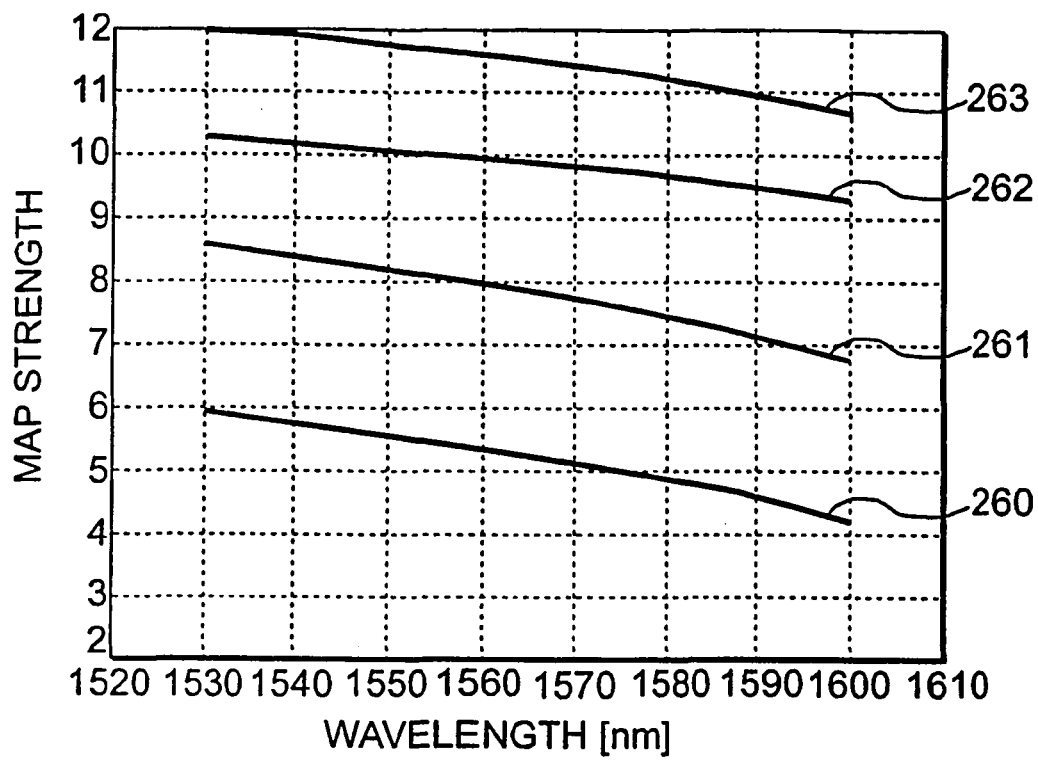
FIG. 25 is a graph of map strength versus wavelength for the twelfth group of embodiments of the present invention.
Figure 26:
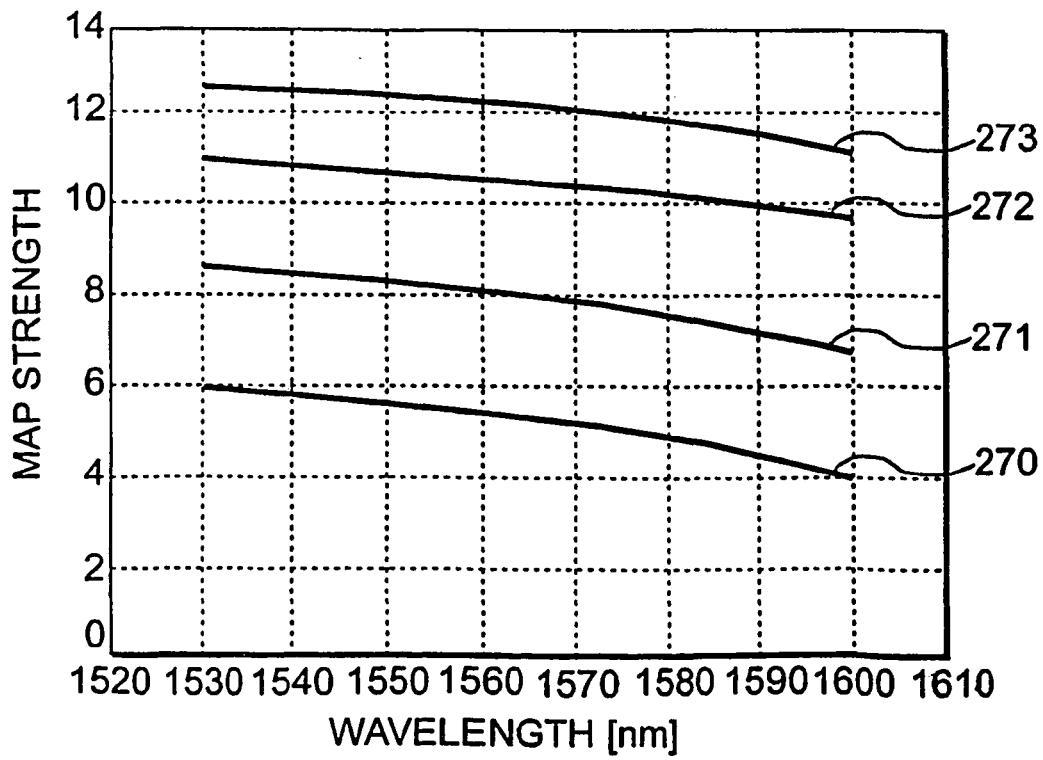
FIG. 26 is a graph of map strength versus wavelength for the thirteenth group of embodiments of the present invention.

The level of dispersion for the embodiments of FIGS. 19–22 is much lower than for the previous embodiments. For long map periods, the absolute value of dispersion gets so low that it may make WDM channels susceptible to four-wave mixing. As well, the maximum level of map strength may exceed 8 and even 12 for long map periods, as shown by the graphs in FIGS. 23–26. These figures illustrate map strength S versus the wavelength range for the embodiments in FIGS. 19–22. The curves 240–243 in FIG. 23 refer to the map strength obtained with the couples of positive and negative dispersion fibers having dispersion curves reported in FIG. 19. The lower curves clearly correspond to the lower dispersion (in absolute value) fibers. The curves 250–253 in FIG. 24 refer to the map strength obtained with the couples of positive and negative dispersion fibers having dispersion curves reported in FIG. 20. The curves 260–263 in FIG. 25 refer to the map strength obtained with the couples of positive and negative dispersion fibers having dispersion curves reported in FIG. 21. The curves 270–273 in FIG. 26 refer to the map strength obtained with the couples of positive and negative dispersion fibers having dispersion curves reported in FIG. 22. In order to avoid problems due to high map strength values and/or four-wave-mixing, short map periods, e.g., in the range of less than 60 km, are preferred for implementing the present invention at 40 Gbit/s.

In order to summarize the characteristics of the fibers for the preferred embodiments of the present invention, FIGS. 27A to 38 show the dispersion curves and the slope curves of the positive and the negative dispersion fibers versus an equivalent map period parameter $\chi=(L_P q_0^2 B^2)$ that takes into account, in comprehensive manner, the map period $L_P$, the factor $q_0$ and the bit rate B. The curves were obtained by a series of calculations similar to those of the previous figures. For these calculations, the pre-emphasis factor $F_{pem}$ was set to 1, as the effect of the attenuation of the fibers resulted to be negligible in order to plot the graphs. In all figures the $\chi$ parameter ranges from $0.9 \cdot 10^5$ to $3.75 \cdot 10^6$ km·Gbit$^2$·s$^{-2}$ (in logarithmic scale). This corresponds, for a bit rate of 10 Gbit/s and a pulsewidth factor of 5, to map periods ranging from 36 km to 1500 km. Other bit rates and/or pulsewidth factors can clearly be used with the same plots.

In all the FIGS. 27A–38, three curves are reported, relating to fibers suitable for designing dispersion maps having, respectively, a minimum map strength equal to 4 (solid line), a maximum map strength equal to 8 (dotted line) or a maximum map strength equal to 12 (dashed line) across a whole wavelength range comprised between 1529 and 1602 nm.

In particular, FIGS. 27A to 30B show plots of fibers for symmetrical maps, whereas FIGS. 31 to 38 show plots of fibers for completely asymmetrical maps (fiber+compensating grating).

The dispersion curves collect the dispersion values D (in ps/nm/km) taken at 1550 nm for any value of $\chi$. The slope curves collect, for any value of $\chi$, the slope values Z (in ps/nm$^2$/km) calculated by means of the ratio $$(D_{1602}-D_{1529})/(1602 \text{ nm}-1529 \text{ nm})$$

wherein $D_{1529}$ and $D_{1602}$ are the dispersion values at 1529 nm and 1602 nm, according to the definition previously given.

Figure 27A:
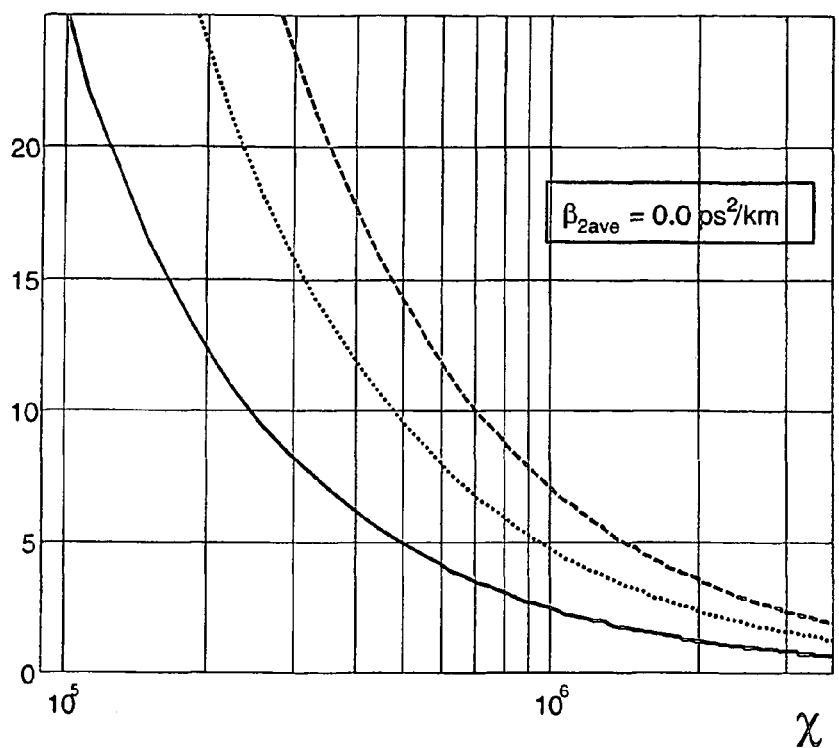
FIGS. 27A–B show dispersion curves for positive dispersion fibers and for companion negative dispersion fibers (combined in symmetrical maps) versus a parameter comprehensive of the map period, the bit rate and the $q_0$ factor, for different map strength behaviours, with an average GVD of the system of 0.0 ps$^2$/km.
Figure 27B:
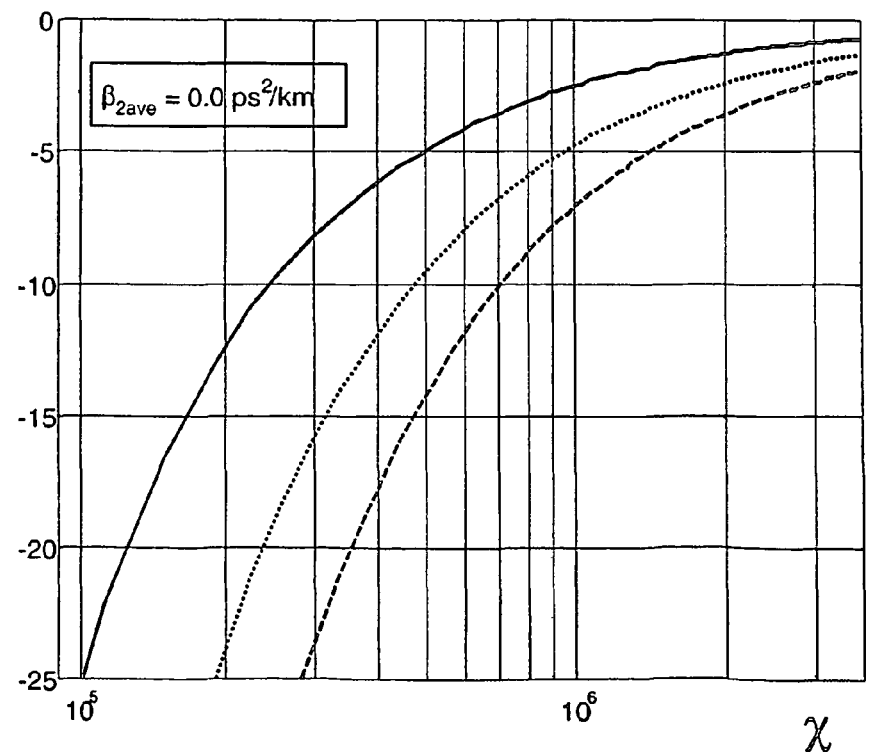

FIGS. 27A–B show the dispersion curves for positive dispersion fibers and for the companion negative dispersion fibers, respectively, combined in series so that the average GVD of the system is 0.0 ps$^2$/km. As it can be seen, the absolute value of the dispersion of both fibers decreases for increasing $\chi$, that is for increasing map period and/or bit rate (and/or $q_0$ factor). The three curves in each plot may be used for defining suitable ranges of dispersion values for any value of the parameter $\chi$, in order to obtain a minimum of map strength higher than or equal to about 4, lower than or equal to about 8, lower than or equal to about 12 across the whole wavelength range. As the dispersion map is symmetrical around a GVD of 0.0 ps$^2$/km, the dispersion curves of the positive and of the negative dispersion fibers are substantially specular.

Figure 28A:
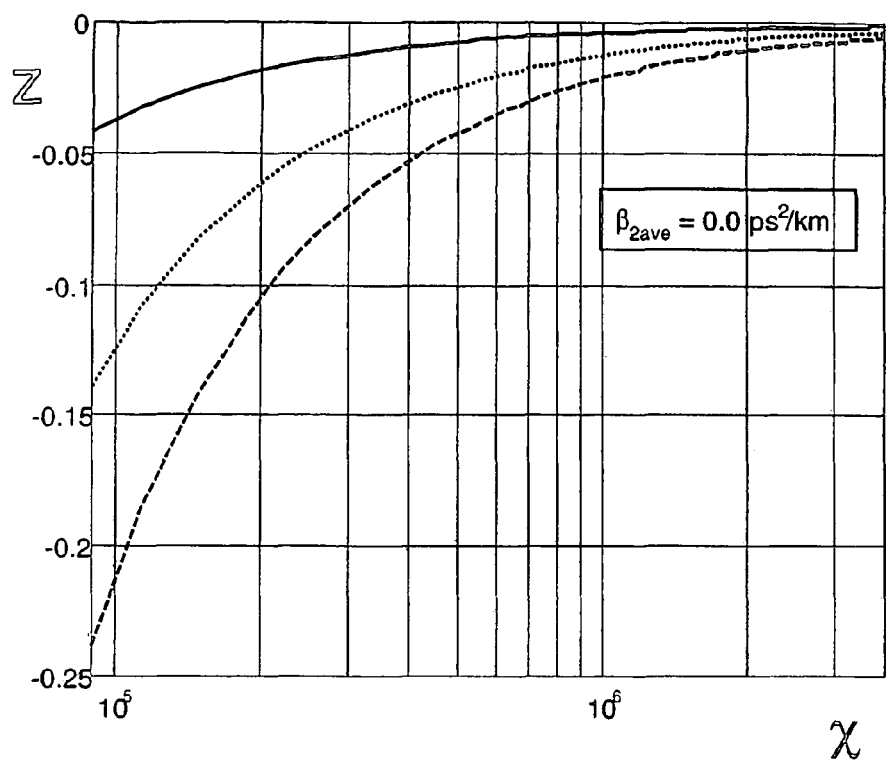
FIGS. 28A–B show slope curves for the positive and negative dispersion fibers of FIGS. 27A–B, versus the same parameter.
Figure 28B:
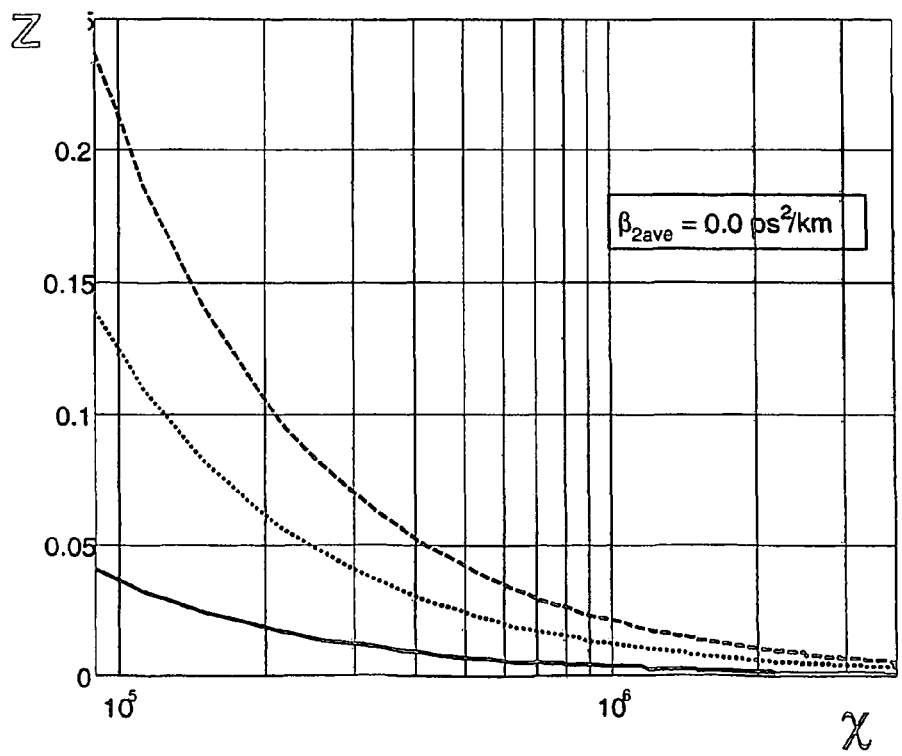

FIGS 28A–B show the slope curves of the fibers having dispersion plotted in FIGS. 27A–B, respectively. As it can be seen, the slope of the fibers (in absolute value) increases for increasing map strength. An increase in the map strength corresponds to an increase of the soliton power. Thus, as can be inferred by FIGS. 27A–B and 28A–B, the more the soliton power is increased, the more the dispersion and the slope of the fibers should be enhanced (in absolute value). Slope values in the preferred embodiments are lower than about 0.25 ps/nm$^2$/km (in absolute value). Further, the slope of the fibers decreases (in absolute value) with increasing map period and/or bit rate (and/or $q_0$ factor), approaching zero for high values of $\chi$. The minimum slope absolute value reached in the plots of FIGS. 28A, 28B, 30A, 30B is about 0.007 ps/nm$^2$/km.

Figure 29A:
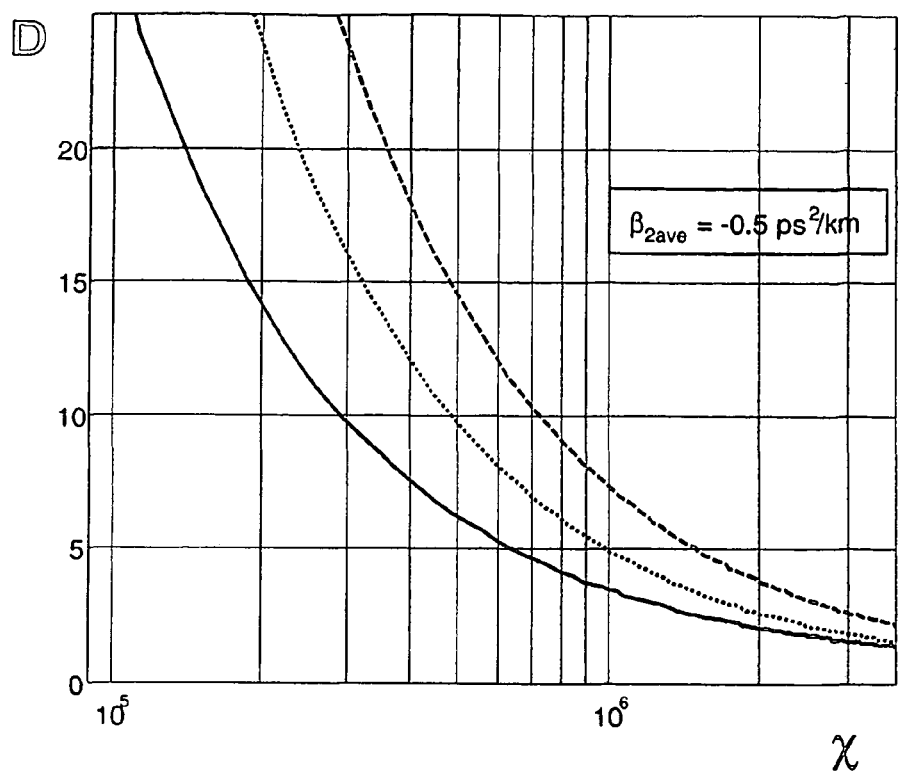
FIGS. 29A–B show dispersion curves for positive dispersion fibers and for companion negative dispersion fibers (combined in symmetrical maps) versus the parameter comprehensive of the map period, the bit rate and the $q_0$ factor, for different map strength behaviours, with an average GVD of the system of –0.5 ps$^2$/km.
Figure 29B:
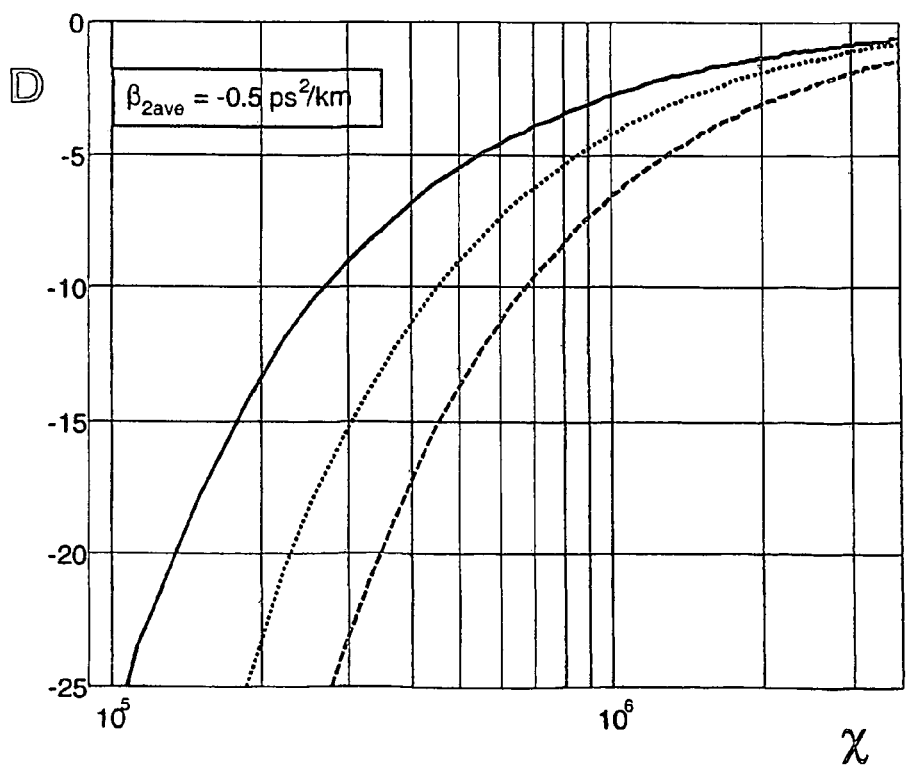
Figure 30A:
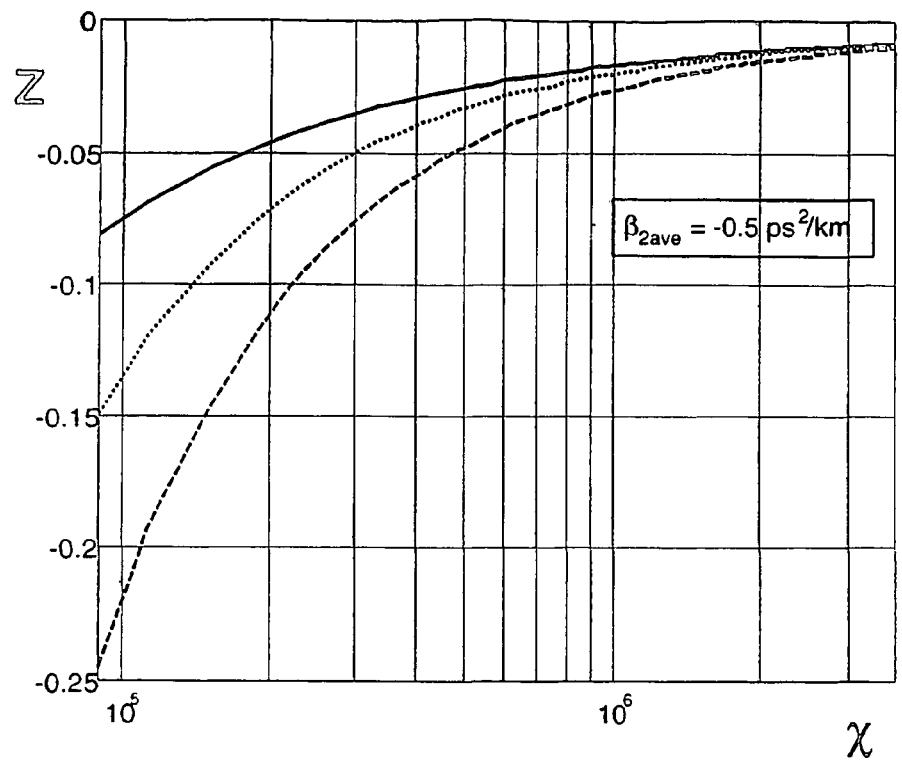
FIGS. 30A–B show slope curves for the positive and negative dispersion fibers of FIGS. 29A–B, versus the same parameter.
Figure 30B:
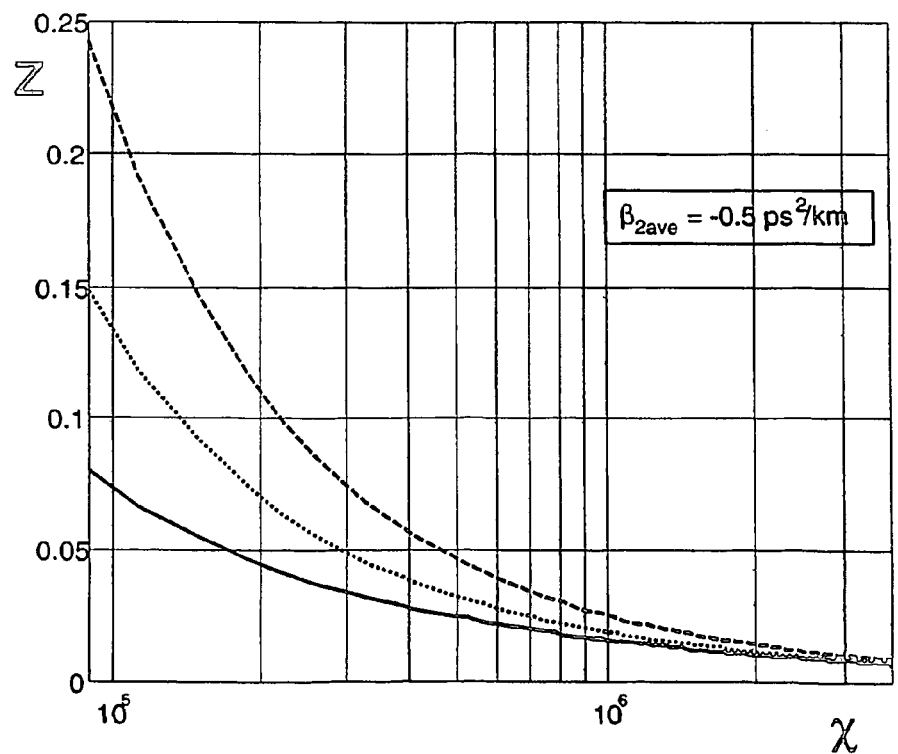

FIGS. 29A–B show dispersion curves similar to those of FIG. 27A–B. The difference between the two series of figures stays in that the positive and negative dispersion fibers of FIGS. 29A–B are combined in series so that the average GVD of the system is -0.5 ps$^2$/km. Thus, the dispersion values reached by the positive dispersion fibers are slightly higher than the dispersion values reached by the companion negative dispersion fibers (in absolute value). FIGS. 30A–B show the slope curves of the fibers having dispersion plotted in FIGS. 29A–B, respectively. The same considerations made for FIGS. 27A–B and 28A–B also apply for FIGS. 29A–B and 30A–B.

Figure 31:
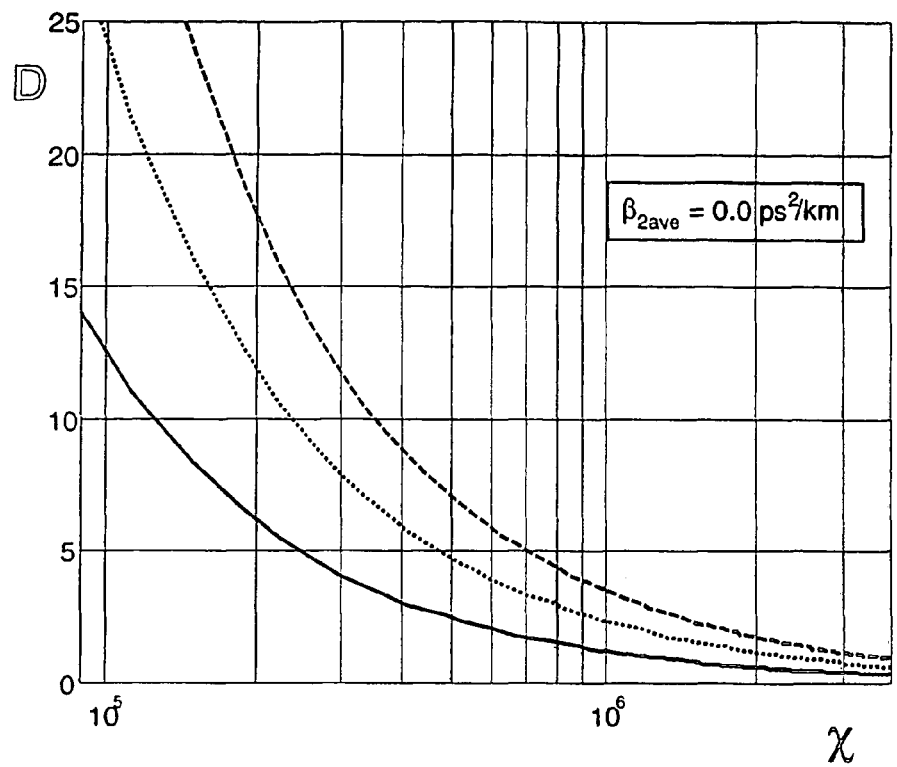
FIG. 31 shows dispersion curves for positive dispersion fibers to be combined to negative dispersion optical gratings in completely asymmetrical maps, versus the parameter comprehensive of the map period, the bit rate and the $q_0$ factor, for different map strength behaviours, with an average GVD of the system of 0.0 ps$^2$/km.
Figure 32:
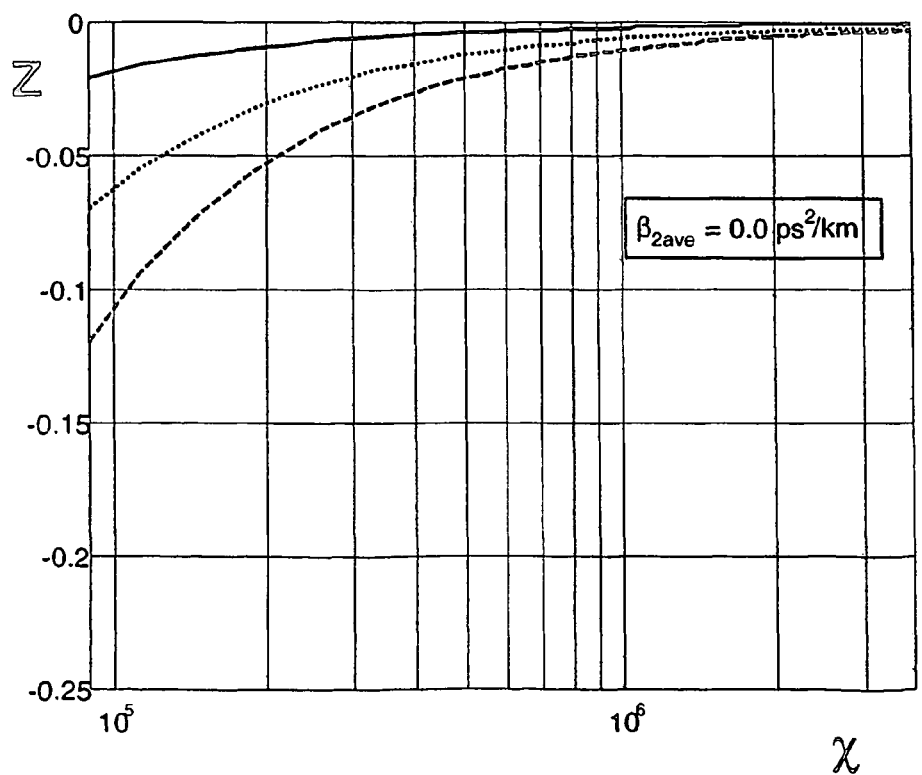
FIG. 32 show slope curves for the positive dispersion fibers of FIG. 31, versus the same parameter.

FIG. 31 shows the dispersion curves for positive dispersion fibers to be compensated by negative dispersion optical gratings, so that the average GVD of the system is 0.0 ps$^2$/km. By comparing FIG. 31 with FIG. 27A, it can be seen that the dispersion values reached by the curves of FIG. 31 are substantially half the dispersion values reached by the curves of FIG. 27A. FIG. 32 shows the slope curves of the fibers having dispersions curves shown in FIG. 31. The slope values reached by the curves in FIG. 32 are substantially half the slope values reached by the curves of FIG. 28A.

Figure 33:
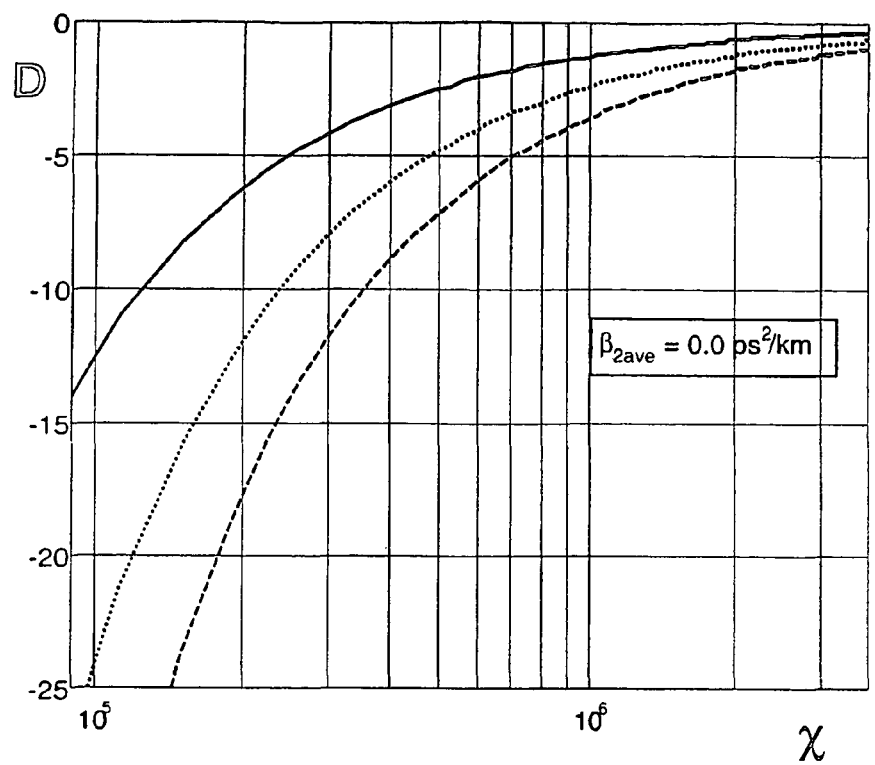
FIG. 33 shows dispersion curves for negative dispersion fibers to be combined to positive dispersion optical gratings in completely asymmetrical maps, versus the parameter comprehensive of the map period, the bit rate and the $q_0$ factor, for different map strength behaviours, with an average GVD of the system of 0.0 ps$^2$/km.
Figure 34:
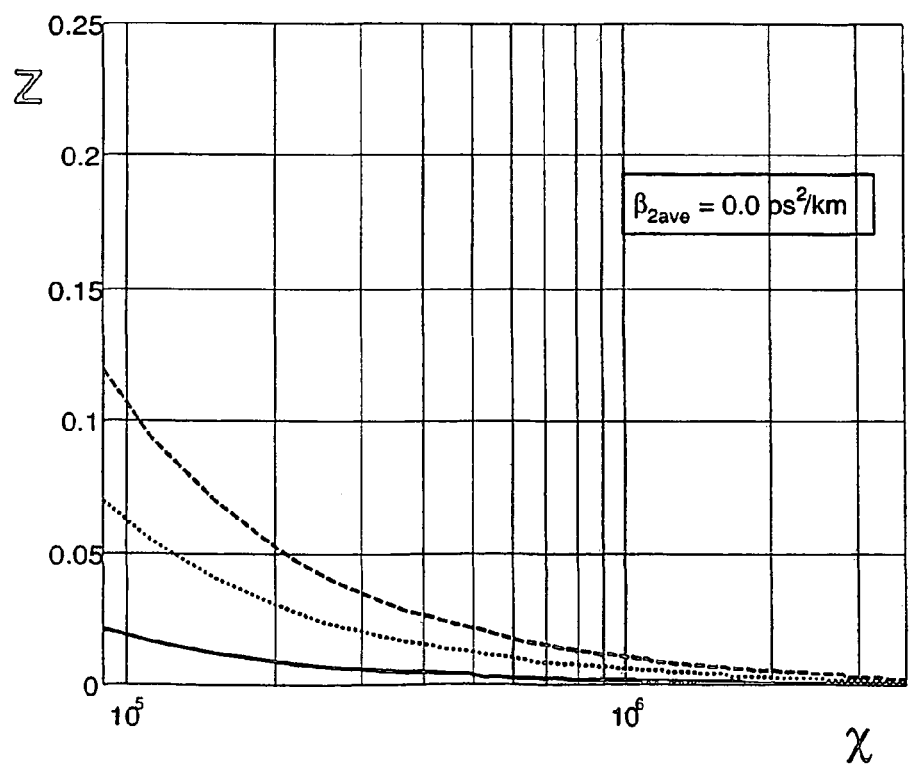
FIG. 34 show slope curves for the negative dispersion fibers of FIG. 33, versus the same parameter.
Figure 35:
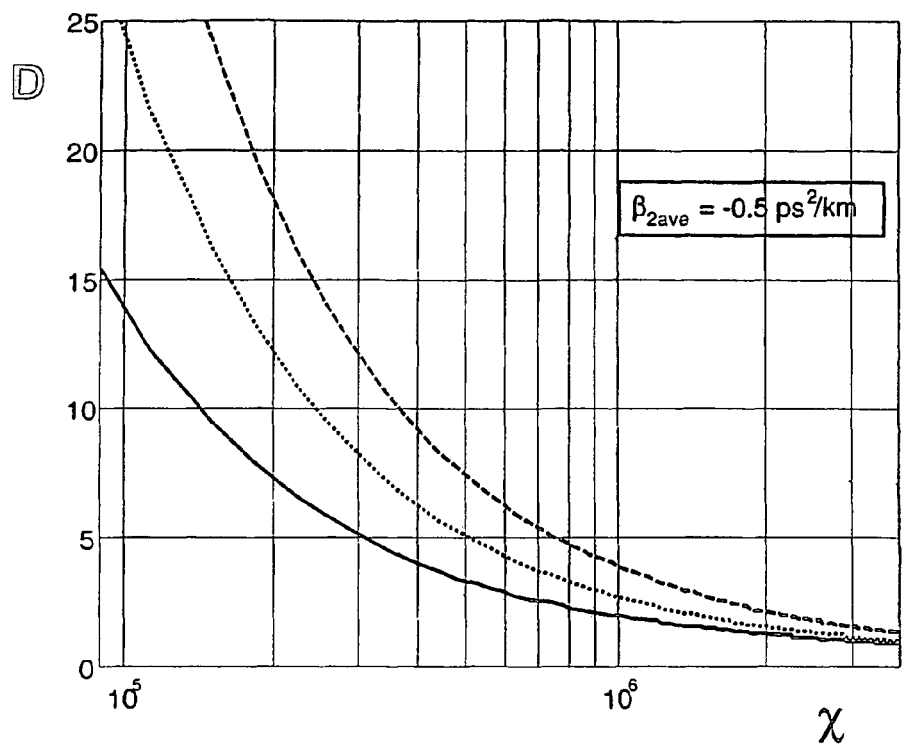
FIG. 35 shows dispersion curves for positive dispersion fibers to be combined to negative dispersion optical gratings in completely asymmetrical maps, versus the parameter comprehensive of the map period, the bit rate and the $q_0$ factor, for different map strength behaviours, with an average GVD of the system of –0.5 ps$^2$/km.
Figure 36:
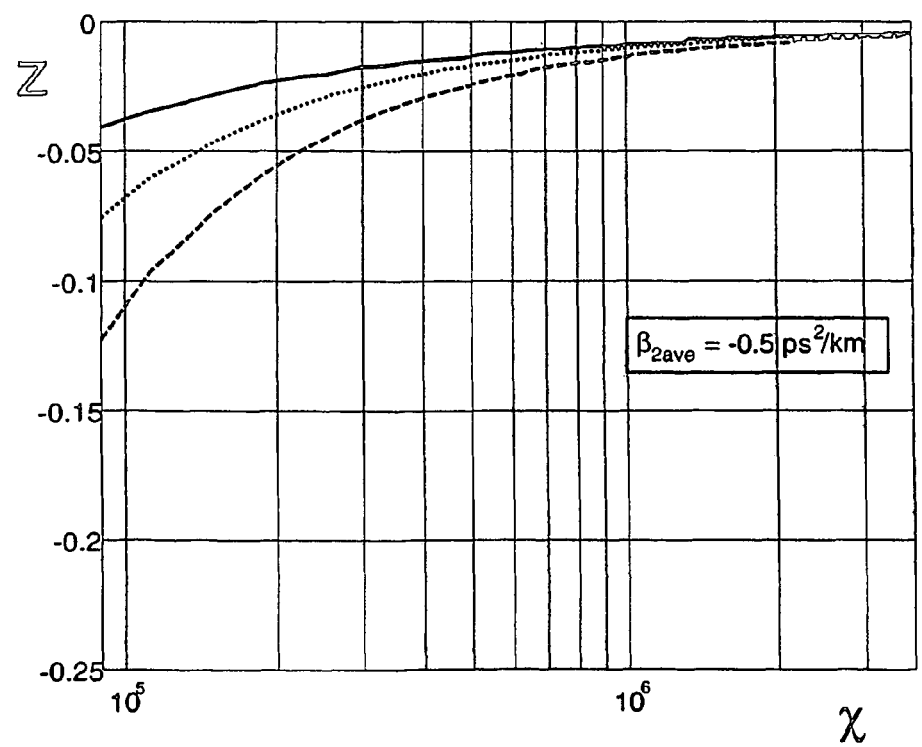
FIG. 36 show slope curves for the positive dispersion fibers of FIG. 35, versus the same parameter.
Figure 37:
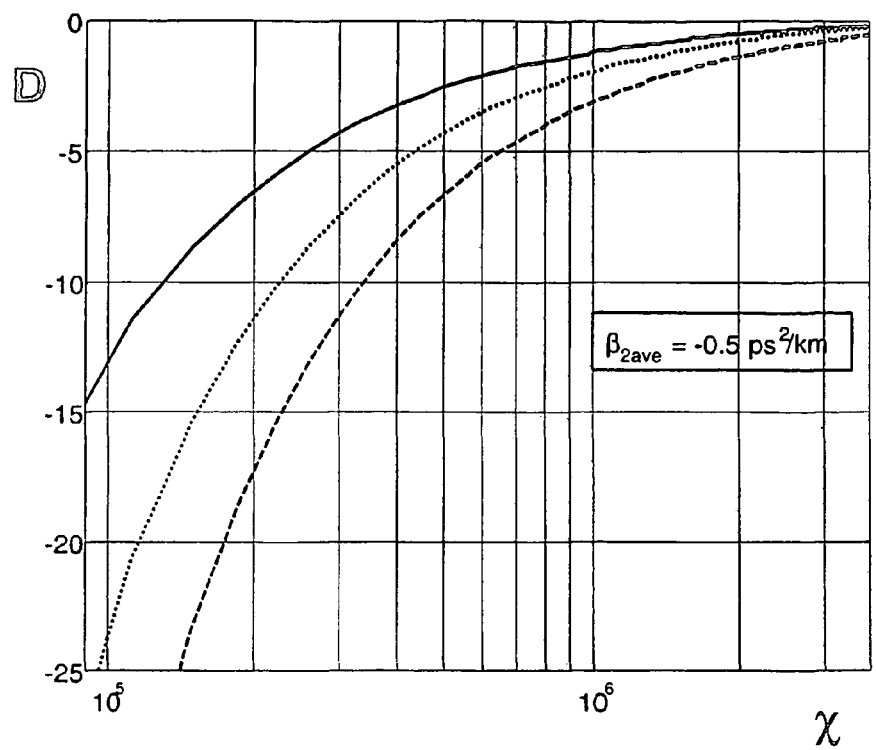
FIG. 37 shows dispersion curves for negative dispersion fibers to be combined to positive dispersion optical gratings in completely asymmetrical maps, versus the parameter comprehensive of the map period, the bit rate and the $q_0$ factor, for different map strength behaviours, with an average GVD of the system of –0.5 ps$^2$/km.
Figure 38:
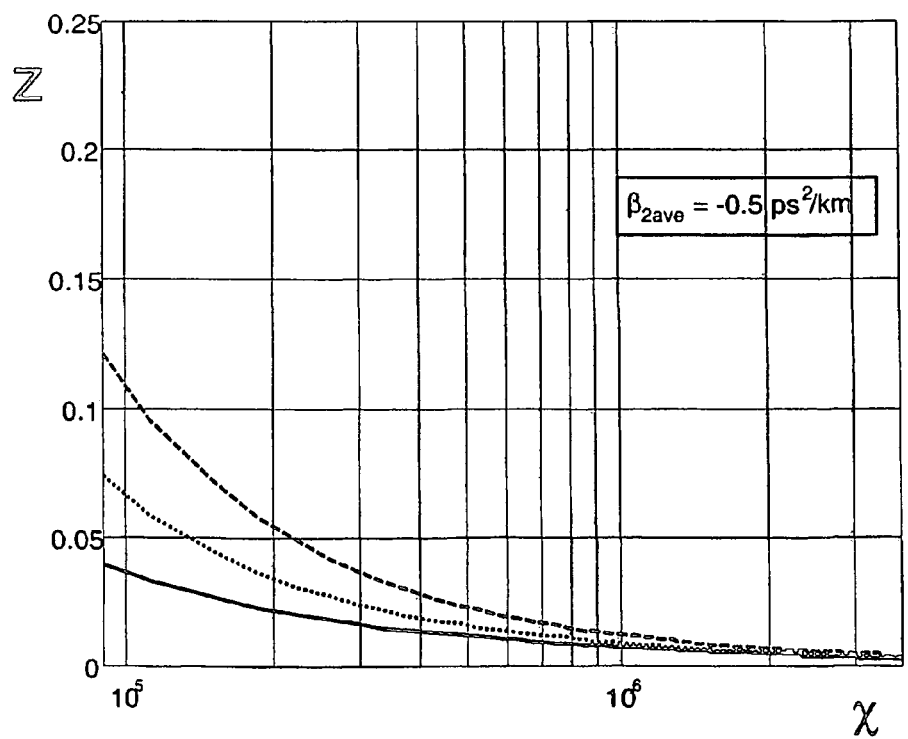
FIG. 38 show slope curves for the negative dispersion fibers of FIG. 37, versus the same parameter.

FIG. 33 and FIG. 34 show the dispersion and slope curves, respectively, for negative dispersion fibers to be compensated by positive dispersion optical gratings, so that the average GVD of the system is 0.0 ps$^2$/km. The curves of FIGS. 33–34 are substantially specular to the curves of FIGS. 31–32.

FIGS. 35 to 38 show dispersion and slope curves similar to those reported in FIGS. 31 to 34. The difference between the two series of figures stays in that the fibers of FIGS. 35–38 are to be combined in series with optical gratings so that the average GVD of the system is -0.5 ps$^2$/km. The same considerations made for FIGS. 31 to 34 also apply for FIGS. 35 to 38.

The minimum slope absolute value reached in the plots of FIGS. 32, 34, 36, 38 is about 0.0005 ps/nm$^2$/km.

Graphs illustrating the characteristics of the fibers for intermediate maps comprised between the symmetrical maps of FIGS. 27A to 30B and the completely asymmetrical maps of FIGS. 31 to 38, that is, for asymmetrical maps comprising optical fibers having different length, can be plotted in an analogous manner. The obtainable dispersion and slope curves are expected to stay in intermediate positions with respect to those presented for at least the fiber having the higher length of the asymmetrical map.

Manufacture of optical fibers for use in a dispersion managed soliton system according to the invention is within the knowledge of one skilled in the art. Techniques for manufacturing may include vapor axial deposition, modified chemical vapor deposition, outside vapor deposition, or similar approaches for making optical preforms and optical fibers. Dopants for obtaining suitable refractive-index profiles are also readily known to those of ordinary skill in the field. In order to obtain a positive dispersion fiber having a negative slope in the wavelength range 1530–1600 nm, refractive index profiles comprising multiple claddings can be designed. For example, W-profile fibers can be used. In order to obtain a negative dispersion fiber having a positive slope, well known techniques for shifting the zero dispersion wavelength until values higher than 1600 nm together with a moderate slope can be used. Dispersion compensating fibers having high negative dispersion values are well known in the art.

It will be apparent to those skilled in the art that various modifications and variations can be made without departing from the scope or spirit of the invention. For example, the description was made with specific reference to a wavelength range comprised between about 1530 nm and 1600 nm, as this range is particularly interesting in relation to the use of erbium doped optical amplifiers. The skilled in the art can adapt the teachings of the invention to other wavelength values and ranges, in dependence of the needings. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A dispersion managed optical soliton transmission system for transmitting wavelength-division-multiplexed optical solitons within a wavelength range, comprising:

at least one transmitter for supplying RZ optical channels, the RZ optical channels having an equalized power-per-channel;

at least a first span comprising a first dispersive element having positive dispersion with a negative dispersion slope across the wavelength range;

at least a second span, positioned in series with the first span in a transmission line, comprising a second dispersive element having negative dispersion with a positive dispersion slope across the wavelength range; and a plurality of wavelength-division-multiplexed optical solitons located in at least one of the first span and the second span, the solitons having a substantially constant power variation over the wavelength range in the RZ optical channels.

2. The dispersion managed optical soliton transmission system as in claim 1, wherein said first and second dispersive elements are optical fibers.

3. The dispersion managed optical soliton transmission system as in claim 2, wherein the length of said first span is substantially equal to the length of said second span.

4. The dispersion managed optical soliton transmission system as in claim 2, wherein the length of said first span is different from the length of said second span.

5. The dispersion managed optical soliton transmission system as in claim 2, wherein the absolute value of the dispersion slope of said optical fibers is higher than about 0.0005 ps/nm$^2$/km.

6. The dispersion managed optical soliton transmission system as in claim 2, wherein the absolute value of the dispersion slope of at least one of said optical fibers is lower than about 0.25 ps/nm$^2$/km.

7. The dispersion managed optical soliton transmission system as in claim 2, wherein the absolute value of the dispersion of said optical fibers is higher than about 1.5 ps/nm/km.

8. The dispersion managed optical soliton transmission system as in claim 1, wherein one of said dispersive elements is an optical fiber and the other of said dispersive elements is an optical grating.

9. The dispersion managed optical soliton transmission system as in claim 8, wherein the absolute value of the sole of said optical fiber is higher than about 0.0005 ps/nm$^2$/km.

10. The dispersion managed optical soliton transmission system as in claim 8, wherein the absolute value of the slope of said optical fiber is lower than about 0.25 ps/nm$^2$/km.

11. The dispersion managed optical soliton transmission system as in claim 8, wherein the absolute value of the dispersion of said optical fiber is higher than about 1.5 ps/mn/km.

12. The dispersion managed optical soliton transmission system as in claim 1, wherein a minimum in map strength of the system across the wavelength range is 4.

13. The dispersion managed optical soliton transmission system as in claim 1, wherein a maximum in map strength of the system across the wavelength range is 12.

14. The dispersion managed optical soliton transmission system as in claim 13, wherein a maximum in map strength of the system across the wavelength range is 8.

15. The dispersion managed optical soliton transmission system as in claim 1, wherein said wavelength range is between about 1530 and 1600 nm.

16. The dispersion managed optical soliton transmission system as in claim 1, further comprising a plurality of optical amplifiers interspersed along said system.

17. The dispersion managed optical soliton transmission system as in claim 1, wherein an average GVD of the dispersion managed system is between −0.5 and 0.0 ps$^2$/km.

18. The dispersion managed optical soliton transmission system as in claim 17, wherein the average GVD of the dispersion managed system is between −0.05 and 0.0 ps$^2$/km.

19. A method of transmitting wavelength division multiplexed solitons across a transmission line within a wavelength range, the method comprising the steps of:

a) generating at least two soliton channels;

b) transmitting said soliton channels across a first span comprising a first dispersive element having positive dispersion with a negative dispersion slope across the wavelength range;

c) transmitting said soliton channels across a second span comprising a second dispersive element having negative dispersion with a positive dispersion slope across the wavelength range; and (d) equalizing a power-per-channel in the two soliton channels, wherein a soliton power variation is kept substantially constant over the wavelength range in the two soliton channels.

20. A WDM dispersion managed soliton transmission system for transmitting solitons of wavelengths in a predetermined wavelength range, comprising:

at least one transmitter for supplying RZ optical channels, the RZ optical channels having an equalized power-per-channel;

at least a first span comprising a first dispersive element; at least a second span comprising a second dispersive element being positioned in series with the first span, said first and second dispersive elements having dispersion characteristics such that a map strength of the dispersion managed system decreases with increasing wavelength across the wavelength range and an average GVD of the dispersion managed system is between −0.5 and 0.0 ps$^2$/km; and a plurality of wavelength-division-multiplexed optical solitons located in at least one of the first span and the second span, the solitons having a substantially constant power variation over the wavelength range in the RZ optical channels.

* * * * *

UNITED STATES PATENT AND TRADEMARK OFFICE
CERTIFICATE OF CORRECTION

| | | |
|---|---|---|
| PATENT NO. | : 7,151,880 B2 | Page 1 of 1 |
| APPLICATION NO. | : 10/451705 | |
| DATED | : December 19, 2006 | |
| INVENTOR(S) | : Francesco Sartori | |

It is certified that error appears in the above-identified patent and that said Letters Patent is hereby corrected as shown below:

Claim 11, column 23, lines 50-51, "1.5 ps/mn/km." should read --1.5 ps/nm/km.--

Signed and Sealed this

Fifteenth Day of May, 2007

JON W. DUDAS
*Director of the United States Patent and Trademark Office*